United States Patent
Yoshikawa et al.

(10) Patent No.: US 10,748,162 B2
(45) Date of Patent: Aug. 18, 2020

(54) INFORMATION PROCESSING DEVICE, INFORMATION PROCESSING SYSTEM, AND INFORMATION PROCESSING METHOD

(71) Applicant: SONY CORPORATION, Tokyo (JP)

(72) Inventors: Kiyoshi Yoshikawa, Saitama (JP); Yuuji Ogihara, Chiba (JP); Shinji Inamoto, Tokyo (JP); Kei Takahashi, Tokyo (JP)

(73) Assignee: SONY CORPORATION, Tokyo (JP)

( * ) Notice: Subject to any disclaimer, the term of this patent is extended or adjusted under 35 U.S.C. 154(b) by 1227 days.

(21) Appl. No.: 14/778,325

(22) PCT Filed: Jan. 31, 2014

(86) PCT No.: PCT/JP2014/052329
§ 371 (c)(1),
(2) Date: Sep. 18, 2015

(87) PCT Pub. No.: WO2014/156295
PCT Pub. Date: Oct. 2, 2014

(65) Prior Publication Data
US 2016/0140578 A1  May 19, 2016

(30) Foreign Application Priority Data
Mar. 25, 2013 (JP) .................. 2013-061804

(51) Int. Cl.
G06F 9/44 (2018.01)
G06Q 30/02 (2012.01)
G06Q 50/10 (2012.01)

(52) U.S. Cl.
CPC ..... G06Q 30/0201 (2013.01); G06Q 30/0282 (2013.01); G06Q 50/10 (2013.01)

(58) Field of Classification Search
CPC ........ G06F 8/61; G06F 11/3616; G06F 16/24; G06F 16/285; G06F 16/3326; G06F 16/9535
See application file for complete search history.

(56) References Cited

U.S. PATENT DOCUMENTS

2004/0205065 A1* 10/2004 Petras ................. B01D 3/146
2005/0268301 A1* 12/2005 Kelley ................. G06F 9/4843
718/100

(Continued)

FOREIGN PATENT DOCUMENTS

JP  2005-293481 A  10/2005
JP  2009-020724 A   1/2009
(Continued)

Primary Examiner — Duy Khuong T Nguyen
(74) Attorney, Agent, or Firm — Chip Law Group

(57) ABSTRACT

There is provided an information processing device including a determination unit that acquires a first history of system information including at least any of input information based on an operation of a user and control information indicating a state at a time of the operation, and to compare the acquired first history with a second history including the system information stored in advance, and a report unit that makes a report for acquiring an opinion related to the first history from the user on the basis of a result of a comparison made by the determination unit.

10 Claims, 14 Drawing Sheets

(56) References Cited

U.S. PATENT DOCUMENTS

| | | | |
|---|---|---|---|
| 2008/0250323 A1* | 10/2008 | Huff | G06F 9/453 |
| | | | 715/733 |
| 2009/0222382 A1* | 9/2009 | Kobza | G01J 3/0208 |
| | | | 705/50 |
| 2010/0077291 A1* | 3/2010 | Takahashi | G06F 40/169 |
| | | | 715/230 |
| 2011/0252394 A1* | 10/2011 | Sharma | G06F 11/3616 |
| | | | 717/101 |
| 2014/0089913 A1* | 3/2014 | Aaronson | G06F 8/61 |
| | | | 717/174 |
| 2014/0156784 A1* | 6/2014 | Buck | H04L 67/1095 |
| | | | 709/217 |

FOREIGN PATENT DOCUMENTS

| | | |
|---|---|---|
| JP | 2010-191751 A | 9/2010 |
| JP | 2011-128742 A | 6/2011 |

\* cited by examiner

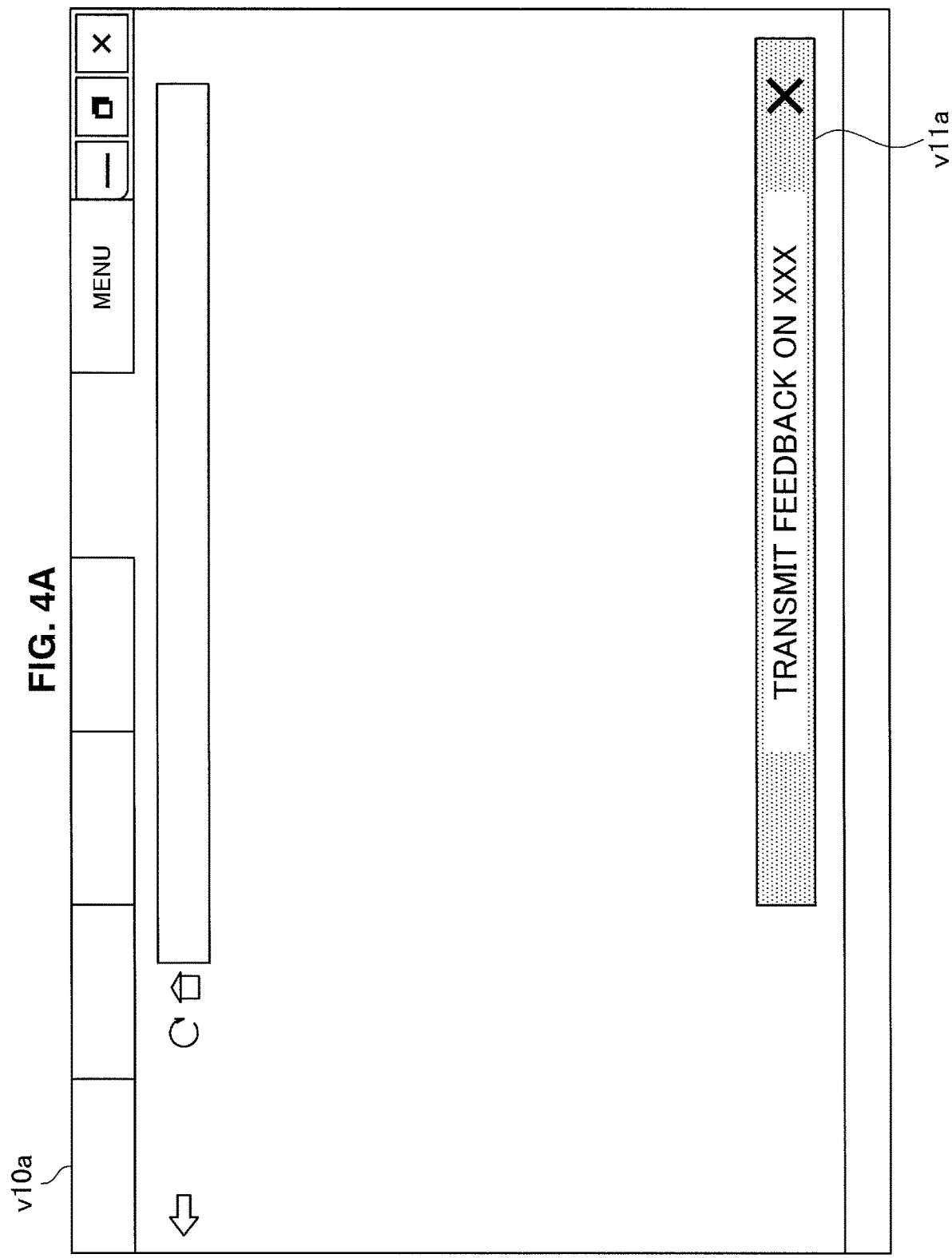

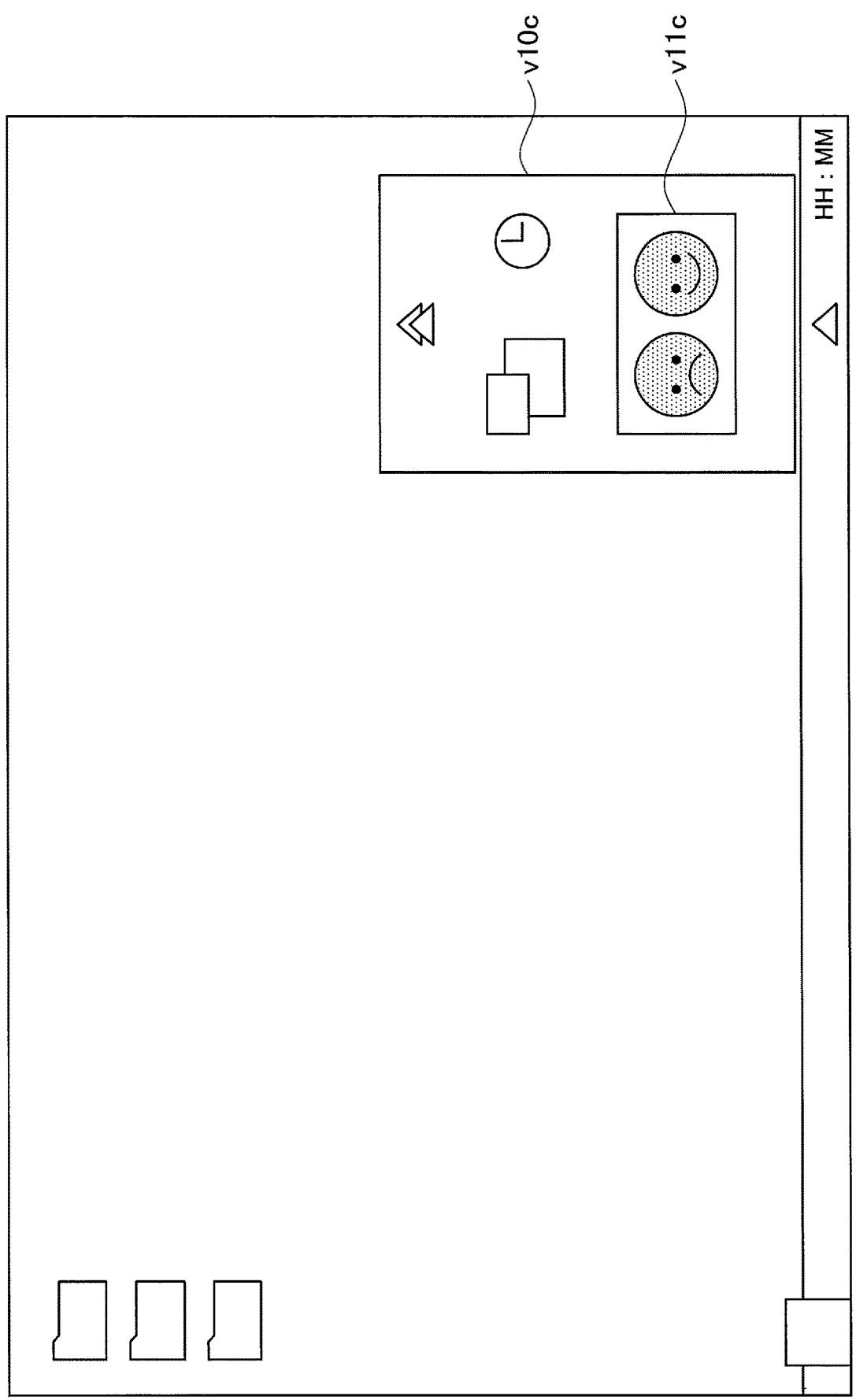

FIG. 9 d300

| d310 | d320 | d330 | d340 | | | | d350 |
|---|---|---|---|---|---|---|---|
| ID | COMMENT | EXPERIENCE | TOTAL NUMBER OF REVIEWS (d341) | APPROVAL (d342) | OBJECTION (d343) | NO COMMENT (d344) | RELATED COMMENT |
| N | COMFORTABLE!! | SOUND SEARCH CONDUCTED BY MICROPHONE OF DEVICE | 300 | 3 | 147 | 150 | |
| N+1 | USELESS | SOUND SEARCH CONDUCTED VIA PERIPHERAL DEVICE | 120 | 100 | 5 | 15 | |
| N+2 | MUCH DELAY | SOUND SEARCH CONDUCTED VIA PERIPHERAL DEVICE | 30 | 20 | 7 | 3 | N+1 |

INFORMATION PROCESSING DEVICE, INFORMATION PROCESSING SYSTEM, AND INFORMATION PROCESSING METHOD

TECHNICAL FIELD

The present disclosure relates to an information processing device, an information processing system, and an information processing method.

BACKGROUND ART

There are information processing systems that acquire evaluations of products or applications and comments on them as feedback from users in order to improve the quality of the products or the applications.

CITATION LIST

Patent Literature

Patent Literature 1: JP 2011-128742A

SUMMARY OF INVENTION

Technical Problem

If a large number of unspecified users are asked for evaluations and comments regarding the ways of using products or applications, the large number of unspecified users include users who have not experienced the target ways of use in some cases. These users who have not experienced the target ways of use are not always able to make appropriate evaluations. Accordingly, evaluations and comments from originally intended users are mixed with evaluations and comments from unintended users, so that it is sometimes difficult to appropriately analyze them.

The present disclosure thus provides a novel and improved information processing device, information processing system, and information processing method that can ask users who have experienced a specific way of use to evaluate that way of use.

Solution to Problem

According to the present disclosure, there is provided an information processing device including: a determination unit configured to acquire a first history of system information including at least any of input information based on an operation of a user and control information indicating a state at a time of the operation, and to compare the acquired first history with a second history including the system information stored in advance; and a report unit configured to make a report for acquiring an opinion related to the first history from the user on the basis of a result of a comparison made by the determination unit.

In addition, according to the present disclosure, there is provided an information processing system including: a storage unit configured to store a history of system information including at least any of input information based on an operation of a first user and control information indicating a state at a time of the operation; a determination unit configured to acquire the history of the system information based on an operation of a second user, and to compare the acquired history with the history that is stored in the storage unit and based on the operation of the first user; and a report unit configured to make a report for acquiring an opinion related to the history based on the operation of the second user from the second user on the basis of a result of a comparison made by the determination unit.

In addition, there is provided an information processing method including: a step of acquiring a first history of system information including at least any of input information based on an operation of a user and control information indicating a state at a time of the operation, and comparing the acquired first history with a second history including the system information stored in advance; and a step of making a report for acquiring an opinion related to the first history from the user on the basis of a result of the comparison made by a determination unit.

Advantageous Effects of Invention

According to the present disclosure as described above, it becomes possible to provide an information processing device, information processing system, and information processing method that can ask users who have experienced a specific way of use to evaluate that way of use.

BRIEF DESCRIPTION OF DRAWINGS

FIG. 4A is a diagram illustrating an instance of a screen for requesting a review.

FIG. 4C is a diagram illustrating an instance of a screen for requesting a review.

FIG. 9 is a diagram illustrating an example of a comment management table to be stored in a comment DB.

DESCRIPTION OF EMBODIMENTS

Hereinafter, preferred embodiments of the present disclosure will be described in detail with reference to the appended drawings. Note that, in the present description and the drawings, elements that have substantially the same function and structure are denoted with the same reference signs, and repeated explanation is omitted.

The description will be now made in the following order.
1. Overview of Information Processing System
2. Configuration of Each Unit
   2.1. Configuration of User Terminal
   2.2. Configuration of Server
3. Process
   3.1. Overview
   3.2. Initial Setting Phase
   3.3. Phase for Collecting Comment and Evaluation
   3.4. Analysis Phase
4. Modification
5. Hardware Configuration
6. Conclusion <1. Overview of Information Processing System>

Figure 1:
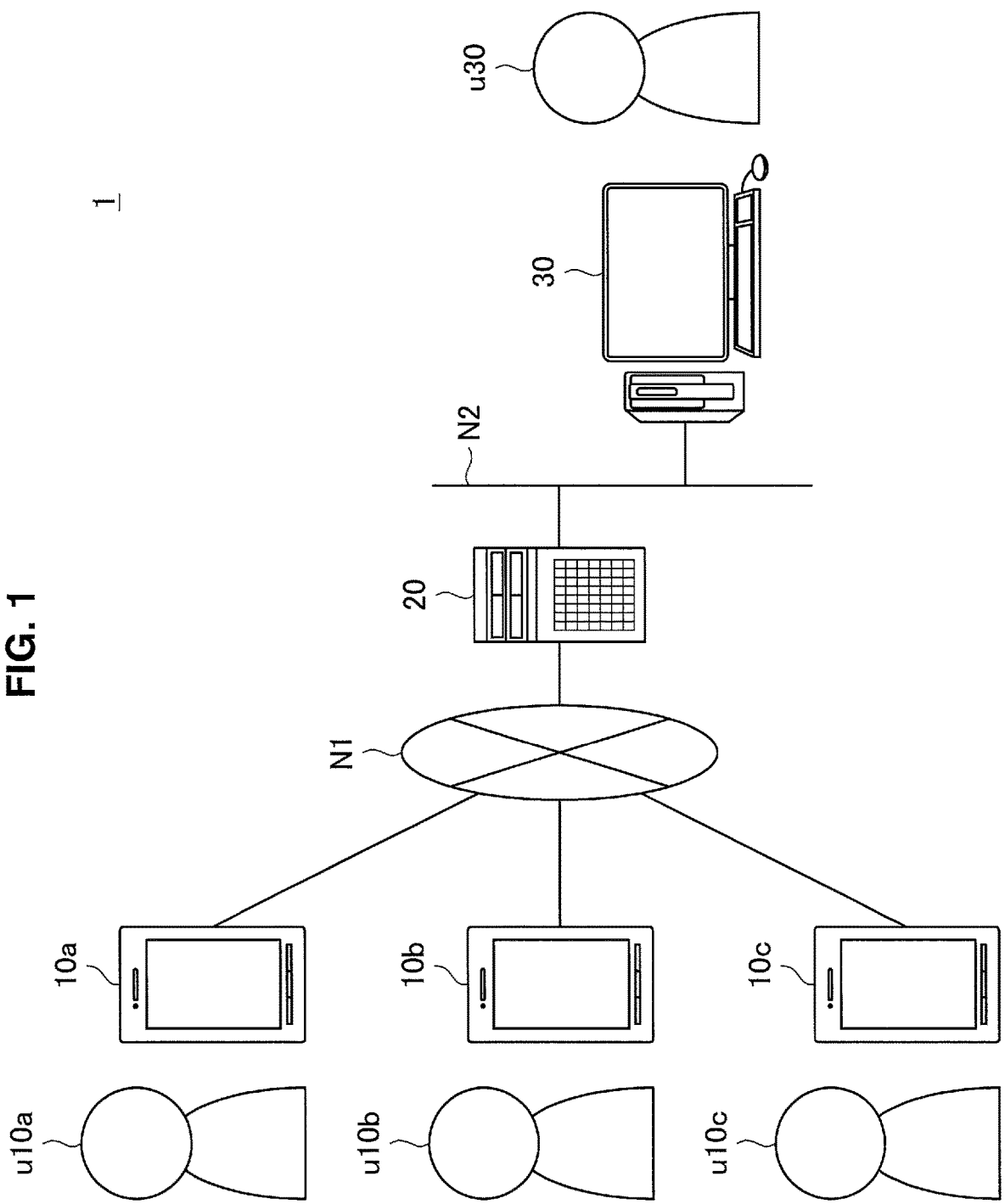
FIG. 1 is a diagram illustrating a configuration of an information processing system according to an embodiment of the present disclosure.

First of all, the system configuration of an information processing system 1 according to an embodiment of the present disclosure will be described with reference to FIG. 1. The information processing system 1 includes a plurality of user terminals 10, a server 20, and a local terminal 30. The example illustrated in FIG. 1 shows user terminals 10a to 10c as the plurality of user terminals 10. The user terminals 10a to 10c indicate the user terminals 10 of users u10a to u10c, respectively.

The user terminals 10a to 10c are connected to the server 20 via a network N1 in a manner that the user terminals 10a to 10c and the server 20 can communicate with each other. Meanwhile, the server 20 is connected to the local terminal 30 via a network N2 in a manner that the server 20 and the local terminal 30 can communicate with each other. A specific example of the network N1 includes the Internet or a dedicated line. A variety of networks such as a local area network (LAN) and a wide area network (WAN) can be used for the network N2. Although the example illustrated in FIG. 1 describes the networks N1 and N2 as different networks, the network configuration is not necessarily limited to FIG. 1 as long as structural elements of the information processing system 1 can communicate with each other. For example, the networks N1 and N2 may also be configured as a single network.

The information processing system 1 collects an evaluation and a comment regarding a specific function of a product or application and a specific way of using them (which will also be referred to simply as "way of use" below) from each of the users u10 (such as the users u10a to u10c), and causes the server 20 to store them. A developer u30 of the product or application to be evaluated refers to and analyzes the evaluation and the comment from each of the users u10 stored in the server 20 via the local terminal 30, thereby using them for improving the quality of the product or application.

Figure 2:
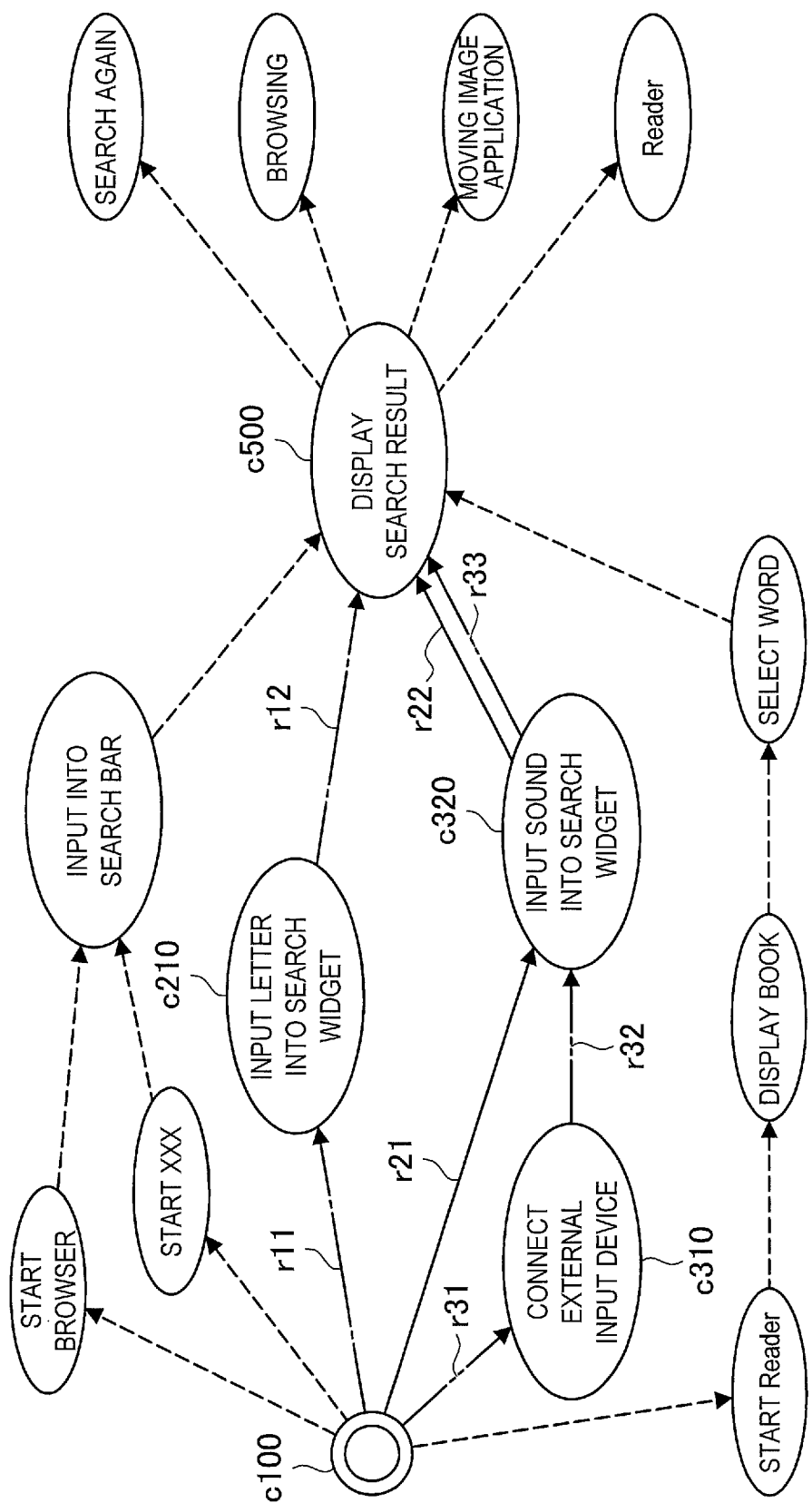
FIG. 2 is a diagram for describing an overview of the information processing system according to the present embodiment.

Meanwhile, there are a diversity of user interfaces for products or applications today, frequently providing a plurality of ways of use as means for executing a certain function. A specific example will be described with reference to FIG. 2. FIG. 2 is a diagram for describing the overview of the information processing system 1, and illustrates, as a specific example, examples of ways of use for executing a search function.

FIG. 2 illustrates ways of use in which a search formula is designated by inputting a letter, a sound, or the like when an application is caused to conduct a search and to display a search result as an operation c500. For example, the way of use indicated by routes r11 and r12 in FIG. 2 shows a way of use in which "inputting a letter into a search widget" as indicated by an operation c210 designates a search formula and causes an application to conduct a search. Additionally, c100 in FIG. 2 indicates a standard state of an operation of the user terminal 10 which is observed, for example, immediately after a home button is pressed, or immediately after the user terminal 10 is started.

In addition, a way of use is possible as another example in which "inputting a sound into a search widget" as indicated by an operation c320 designates a search formula and causes an application to conduct a search. When the operation c320 is executed, a sound collecting unit (such as a microphone) built in the user terminal 10 is sometimes used, and a sound is input from an external input device by "connecting an external input device" as indicated by c310 at other times.

Even if a large number of unspecified users u10 are asked for comments regarding a specific way of use among a diversity of ways of use as illustrated in FIG. 2, the large number of users u10 include the users u10 who have not experienced the target way of use in some cases. These users u10 who have not experienced the target ways of use are not always able to make appropriate evaluations.

Even if the users u10 who use only a search by inputting a letter (routes r11 and r12) are asked to evaluate the way of use (routes r31 to r33) in which a sound is input by using an external input device as a specific example, it is doubtful that the users u10 can make appropriate evaluations because the users u10 have not experienced the way of use in which a sound is input.

Even if evaluations and comments (which will also be referred to as "opinions" in general below) from of the respective users u10 are mixed with opinions from the users u10 who have not experienced the target way of use, it is difficult to evaluate the validity (i.e. reliability) of each opinion. Accordingly, it is difficult to extract an opinion of high importance (such as an opinion of high reliability) from the mixed opinions of high reliability and low reliability, consequently making an appropriate analysis difficult in some cases.

In particular, as the scale of a user group asked for evaluations expands, the number of opinions from the users u10 becomes larger in accordance with the scale of the user group. Accordingly, it is difficult to refer to all of the opinions, so that opinions of high importance are frequently analyzed as samples. Thus, as the scale of a user group asked for evaluations is expanding, a mixture of evaluations and opinions of high reliability with opinions of low reliability makes an appropriate analysis remarkably more difficult to conduct in most cases.

To the contrary, regarding a specific way of using a product or an application function, the users u10 who have experienced the same way of using the product or the application function can frequently make more appropriate evaluations than the other users u10.

Accordingly, an object of the information processing system 1 according to an embodiment of the present disclosure is to make it possible to easily determine the validity of opinions (comments) on a specific way of using a product or an application by asking the users u10 who have experienced the same way of use to evaluate the opinions.

Specifically, the information processing system 1 defines an operation in a predetermined procedure as a user experience. For example, the information processing system 1 defines an operation in the procedure indicated by the routes r31 to r33 in FIG. 2 as a user experience of a "sound input via an external input device." The information processing device 1 then collect an opinion such as an evaluation and a comment for each user experience, and associates them.

Furthermore, the information processing system 1 asks the user u10 who has performed an operation in the same procedure as in the user experience with which an opinion is associated to evaluate the opinion associated with that user experience. Additionally, the details of user experiences will be discussed below along with the configurations of the user terminal 10 and the server 20.

The user u10 who has performed an operation in the same procedure as in a certain user experience evaluate opinions on the user experience in this way, allowing the information processing system 1 to easily determine the validity of the opinions on each user experience. The information processing system 1 according to the present embodiment will be described in detail below.

<2. Configuration of Each Unit>

[2.1. Configuration of User Terminal]

Figure 3:
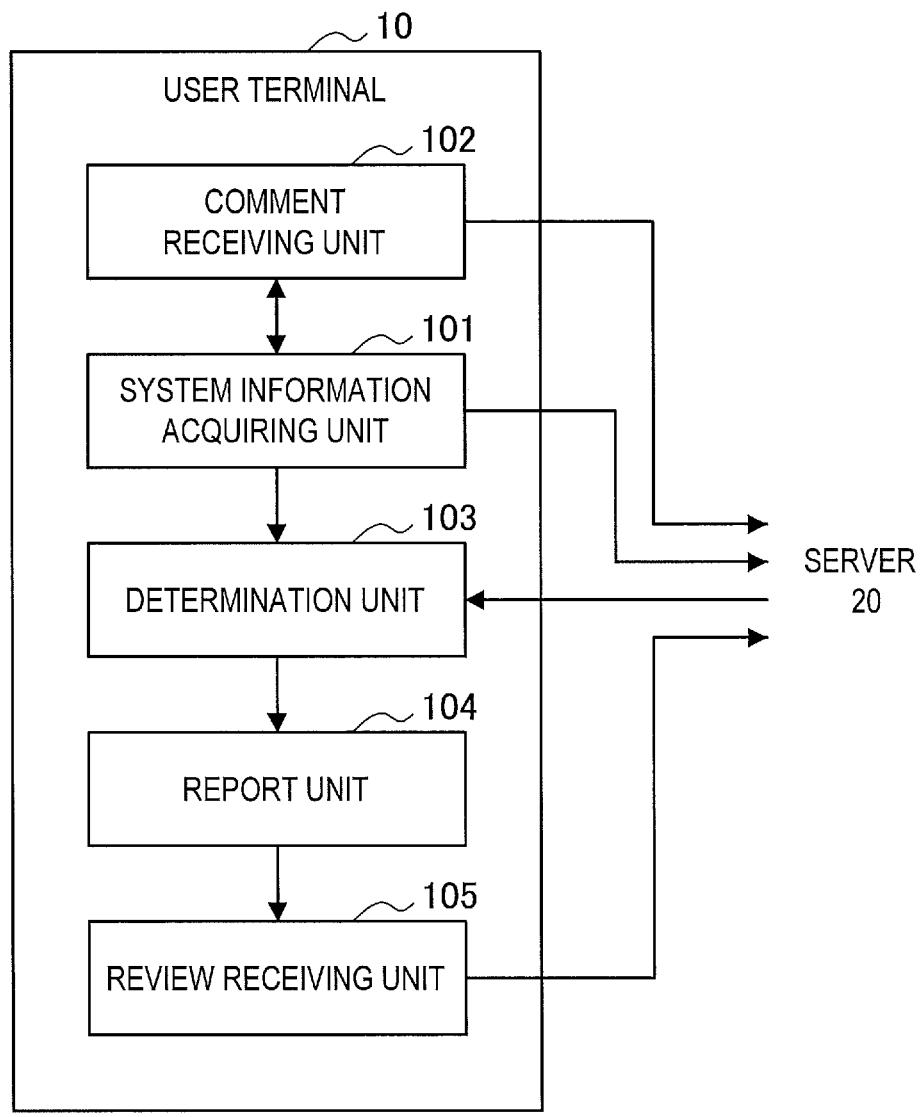
FIG. 3 is a block diagram illustrating a configuration of a user terminal according to the present embodiment.

The configuration of the user terminal 10 will be described with reference to FIG. 3. FIG. 3 is a block diagram illustrating the configuration of the user terminal 10 according to the present embodiment. As illustrated in FIG. 3, the user terminal 10 includes a system information acquiring unit 101, a comment receiving unit 102, a determination unit 103, a report unit 104, and a review receiving unit 105.

The system information acquiring unit 101 monitors the content of an operation of the user u10 on the user terminal 10 and the state of the user terminal 10 at the time of the operation, and acquires system information. Examples of the system information include input information based on an operation of the user u10, and control information (such as a control parameter) indicating the state of the user terminal 10. Additionally, the system information acquiring unit 101 may acquire system information at least when the system information is updated, or specifically, an operation is received from the user u1 or the state of the user terminal 10 is changed and control information is updated.

As a specific example, let us assume that the user u10 starts mail software and displays the content of a mail 1. In this case, the system information acquiring unit 101 acquires input information indicating the "start of mail software" and input information indicating the "selection of the mail 1." The system information acquiring unit 101 further acquires control information for "displaying an inbox" based on the "start of the mail software" and control information for "displaying the mail 1" based on the selection of the "selection of the mail 1" as control information indicating the state based on the operation of the user u10.

The system information acquiring unit 101 reports acquired pieces of system information to the determination unit 103 discussed below in chronological order. The system information acquiring unit 101 may report the acquired pieces of system information to the determination unit 103 consecutively or at each predetermined timing.

The system information acquiring unit 101 records the acquired system information and information indicating the timing at which the system information was acquired (which will be referred to as "time stamp" below) as histories. The system information acquiring unit 101 transmits the history of the recorded system information to the server 20 in association with information for identifying the user terminal 10 (which will be referred to as "terminal information" below). Additionally, the system information and the history will be discussed below along with the description of a system information registering unit 201 and a system information DB 202 in the server 20 discussed below.

The timing at which the system information acquiring unit 101 transmits a history to the server 20 may be set as necessary in accordance with an operation. For example, the system information acquiring unit 101 may be configured to transmit histories recorded by timing decided in advance to the server 20 at the timing. As another example, based on an instruction from the comment receiving unit 102 discussed below, the system information acquiring unit 101 may also transmit histories recorded by that time to the server 20.

The comment receiving unit 102 acquires from the user u10 a comment on a way of using the user terminal 10 itself or an application that operates in the user terminal 10. As a specific example, once an instruction for inputting a comment is issued while the user u10 is operating the user terminal 10 or an application that operates in the user terminal 10, the comment receiving unit 102 presents a user interface (U/I) for inputting a comment to the user u10. The comment receiving unit 102 acquires a comment input by the user u10 into the presented U/I. Operating the comment receiving unit 102 in this way or instructing the user u10 to input a comment, for example, when the user u10 has trouble in the operation allows a comment on the operation performed by that time to be input.

Once the comment receiving unit 102 acquires a comment input by the user u10, the comment receiving unit 102 transmits the acquired comment to the server 20 in association with a time stamp indicating the timing at which that comment was acquired and the terminal information on the user terminal 10.

The comment receiving unit 102 may also instruct the system information acquiring unit 101 to transmit a history to the server 20 when the comment receiving unit 102 acquires a comment. When the system information acquiring unit 101 transmits a history of system information in response to the instruction from the comment receiving unit 102, the history includes at least system information acquired by the time when the comment was input.

The determination unit 103 stores pieces of data indicating one or more user experiences (which will be referred to as "user experience data" below) decided in advance. The user experience data includes a history of system information for an operation performed in a predetermined procedure. As a specific example, user experience data of the "use of mail software" includes histories of system information related to the "start of the mail software" and system information indicating that the started mail software has been "in operation for one or more minutes" arranged in chronological order. Although the details will be discussed below, the user experience data is generated in the server 20 and stored in the server 20. An opinion is sometimes associated with the stored user experience data. The determination unit 103 communicates with the server 20 at predetermined timing, thereby synchronizing the user experience data stored in the determination unit 103 with the user experience data stored in the server 20.

The determination unit 103 acquires pieces of system information from the system information acquiring unit 101 in chronological order in which the pieces of system information were acquired. The determination unit 103 compares the pieces of system information acquired from the system information acquiring unit 101 and arranged in chronological order with histories included in the respective pieces of user experience data stored in advance.

When the determination unit 103 detects a series of system information (i.e. histories) matching with histories included in any of user experience data from the pieces of system information arranged in chronological order, the determination unit 103 causes the server 20 to report a comment associated with the user experience data having the histories with which the series of system information matches. When a comment is associated with the corresponding user experience data in the server 20, the determination unit 103 acquires the comment associated with the user experience data and the identification information (ID) on that comment from the server 20.

When the determination unit 103 acquires the comment and the ID of the comment from the server 20, the determination unit 103 reports the acquired comment and the acquired ID of the comment to the report unit 104.

Once the report unit 104 acquires the comment and the ID of the comment from the determination unit 103, the report unit 104 reports to the user u10 that a comment is associated with a user experience based on the content of an operation of the user u10 and requests a review of that comment. As a specific example, FIGS. 4A to 4C are each a diagram illustrating an instance of a screen requesting a review from the user u10 (asking the user u10 for a review), and illustrate an example of a report from the report unit 104.

For example, FIG. 4A is an example in which a report is made on an operation screen v10a of a predetermined application such as a browser for requesting the user u10 to make a review. When the user u10 performs an operation corresponding to a predetermined user experience, the report unit 104 displays, on the operation screen v10a, an auxiliary screen V11a having a link displayed thereon for displaying a screen for receiving a review result in the example illustrated in FIG. 4A, thereby making a report to the user u10.

Figure 4B:
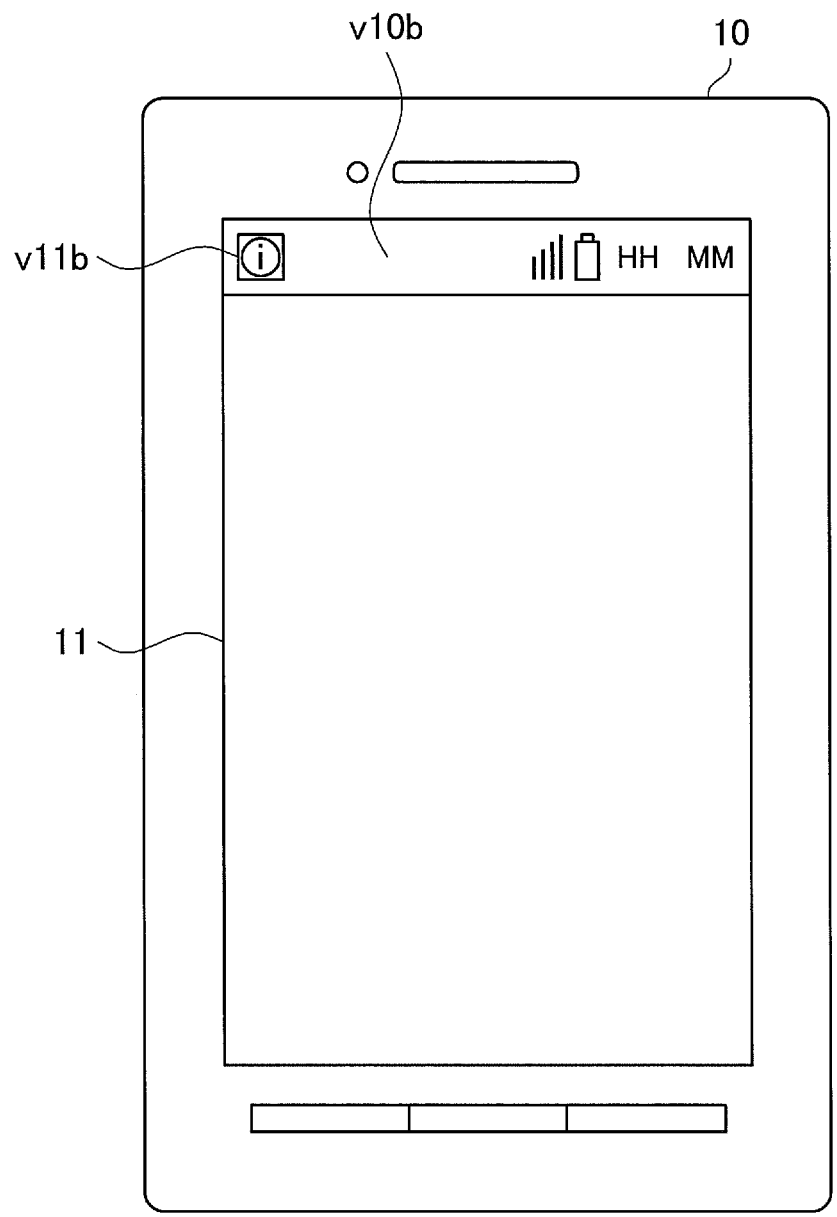
FIG. 4B is a diagram illustrating an instance of a screen for requesting a review.

The example illustrated in FIG. 4B shows an example in which a report is made to a mobile communication terminal such as a smartphone as the user terminal 10. The report unit 104 displays, on a status bar v10b displayed on a screen 11 of the user terminal 10, an icon v11b for displaying a screen for requesting a review and receiving a review result in the example illustrated in FIG. 4B, thereby making a report to the user u10.

Meanwhile, as illustrated in FIG. 4C, a report may also be made to the user u10 by displaying, on a sub-screen v10c presented by an U/I of an operating system (OS), an icon v11c for displaying a screen for requesting a review and receiving a review result.

Additionally, the report unit 104 may also display part or all of the content of a comment acquired from the determination unit 103 in making a report to the user u10 in a manner that the part or all of the content of the comment can be referred to. In addition, the report unit 104 may acquire the user experience data corresponding to a comment from the determination unit 103, and report to the user u10 to which user experience a target for which a review is requested corresponds, on the basis of the acquired user experience data.

Once a review input is selected in response to the report from the report unit 104, the report unit 104 reports to the review receiving unit 105 that an instruction regarding the review input has been issued and outputs the comment acquired from the determination unit 103 and the comment ID to the review receiving unit 105.

Once the review receiving unit 105 receives the report regarding the review input from the report unit 104, the review receiving unit 105 acquires the comment and the comment ID from the report unit 104. The review receiving unit 105 presents the comment associated with the user experience to the user u10, and displays an input screen v20 for receiving a review result of the comment.

Figure 5:
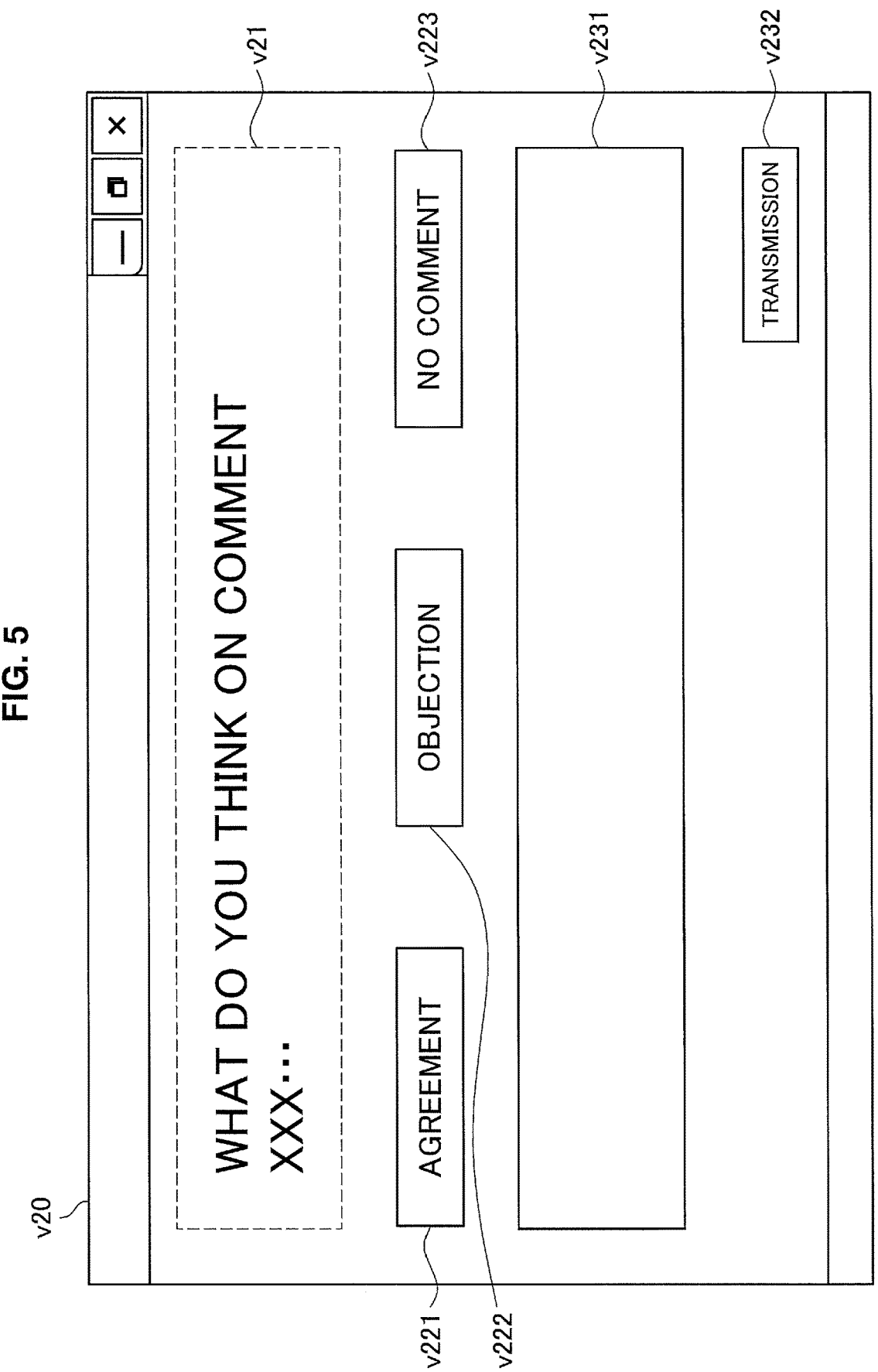
FIG. 5 is a diagram illustrating an example of an input screen for receiving a review result.

Here, FIG. 5 is referred to. FIG. 5 is a diagram illustrating an example of the input screen v20 for receiving an opinion (i.e. evaluation and comment) of the user u10 as a review result. As illustrated in FIG. 5, the input screen v20 includes an information display box v21, evaluation buttons v221 to v223, a comment input box v231, and a transmission button v232.

The information display box v21 is a display box for displaying the content of a comment presented to the user u10 and a message regarding that comment. The review receiving unit 105 displays a comment acquired from the report unit 104 on the information display box v21, thereby presenting the comment to the user u10. Additionally, a comment displayed on the information display box v21 will also be referred to as "evaluation target comment" below.

The evaluation buttons v221 to v223 are buttons for designating an evaluation of an evaluation target comment. The evaluation button v221 corresponds to an "agreement" about an evaluation target comment, and the evaluation button v222 corresponds to an "objection" to an evaluation target comment in the example illustrated in FIG. 5. Meanwhile, the evaluation button v223 corresponds to "no comment" or no evaluation of an evaluation target button (alternatively, there is no evaluating). The review receiving unit 105 recognizes the evaluation of an evaluation target comment by the user u10 in accordance with which of the evaluation buttons v221 to v223 is selected.

The comment input box v231 is an input box for receiving another comment (which will also be referred to as "evaluation comment" below) as supplementary information for the evaluation of an evaluation target comment. For example, when the user u10 selects an "objection" as the evaluation of an evaluation target comment, the user u10 may input a reason of that "objection" evaluation into the comment input box v231 as a supplementary comment. Additionally, an evaluation comment does not necessarily have to be input into the comment box v231.

The transmission button v232 is a button for transmitting an evaluation comment input into the comment input box v231 to the server 20. Once the transmission button v232 is selected, the review receiving unit 105 acquires a supplementary comment input into the comment input box v231 as supplementary information for the evaluation of an evaluation target comment.

The review receiving unit 105 recognizes the evaluation of the evaluation target comment by the user u10 on the basis of an operation on any of the evaluation buttons v221 to v223, and reports information indicating the recognized evaluation and the ID of the evaluation target comment to the server 20. This report from the review receiving unit 105 allows the server 20 to identify the evaluation target comment on the basis of the reported ID of the evaluation target comment, and to associate the evaluation reported from the review receiving unit 105 with the identified evaluation target comment.

The review receiving unit 105 further receives an evaluation comment input into the comment input box v231 when the transmission button v232 is operated. The review receiving unit 105 reports the acquired evaluation comment and the ID of the evaluation target comment to the server 20. This report from the review receiving unit 105 allows the server 20 to identify the evaluation target comment on the basis of the reported ID of the evaluation target comment, and to associate the evaluation comment reported from the review receiving unit 105 with the identified evaluation target comment. Additionally, the review receiving unit 105 corresponds to an example of an "opinion acquiring unit."

In this way, the user terminal 10 of the information processing system 1 according to the present embodiment can ask the user u10 who has performed an operation (i.e.

way of use) indicated by a predetermined user experience to evaluate a comment associated with that user experience.

[2.2. Configuration of Server]

Figure 6:
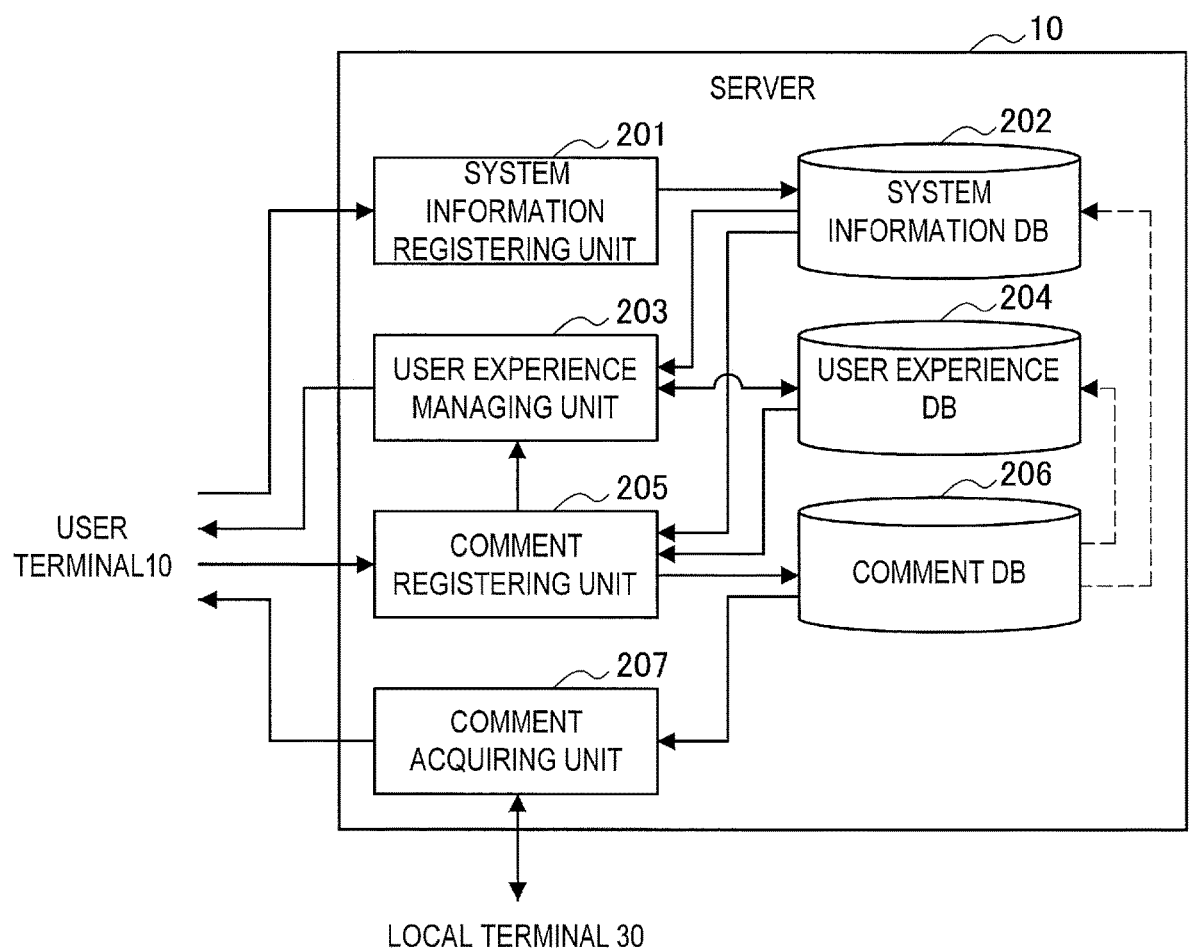
FIG. 6 is a block diagram illustrating a configuration of a server according to the present embodiment.

Next, the configuration of the server 20 will be described with reference to FIG. 6. FIG. 6 is a block diagram illustrating the configuration of the server 20 according to the present embodiment. As illustrated in FIG. 6, the server 20 includes a system information registering unit 201, a system information DB 202, a user experience managing unit 203, a user experience DB 204, a comment registering unit 205, a comment DB 206, and a comment acquiring unit 207.

The system information registering unit 201 acquires a history of system information and terminal information on the user terminal 10, which is a transmission source, from the system information acquiring unit 101 of the user terminal 10. The system information registering unit 201 arranges pieces of system information included in acquired histories in chronological order on the basis of a time stamp indicating the timing at which the pieces of system information were acquired, and stores the pieces of system information in the system information DB 202 for each piece of terminal information. Whenever the system information registering unit 201 acquires histories from the system information acquiring unit 101, the system information registering unit 201 accumulates pieces of system information included in the histories in the system information DB 202 in chronological order for each piece of terminal information. This accumulates a series of histories of system information in the system information DB 202 for each terminal (for each piece of terminal information). The system information DB 202 is a storage unit for storing a history of system information for each terminal.

Figure 7:
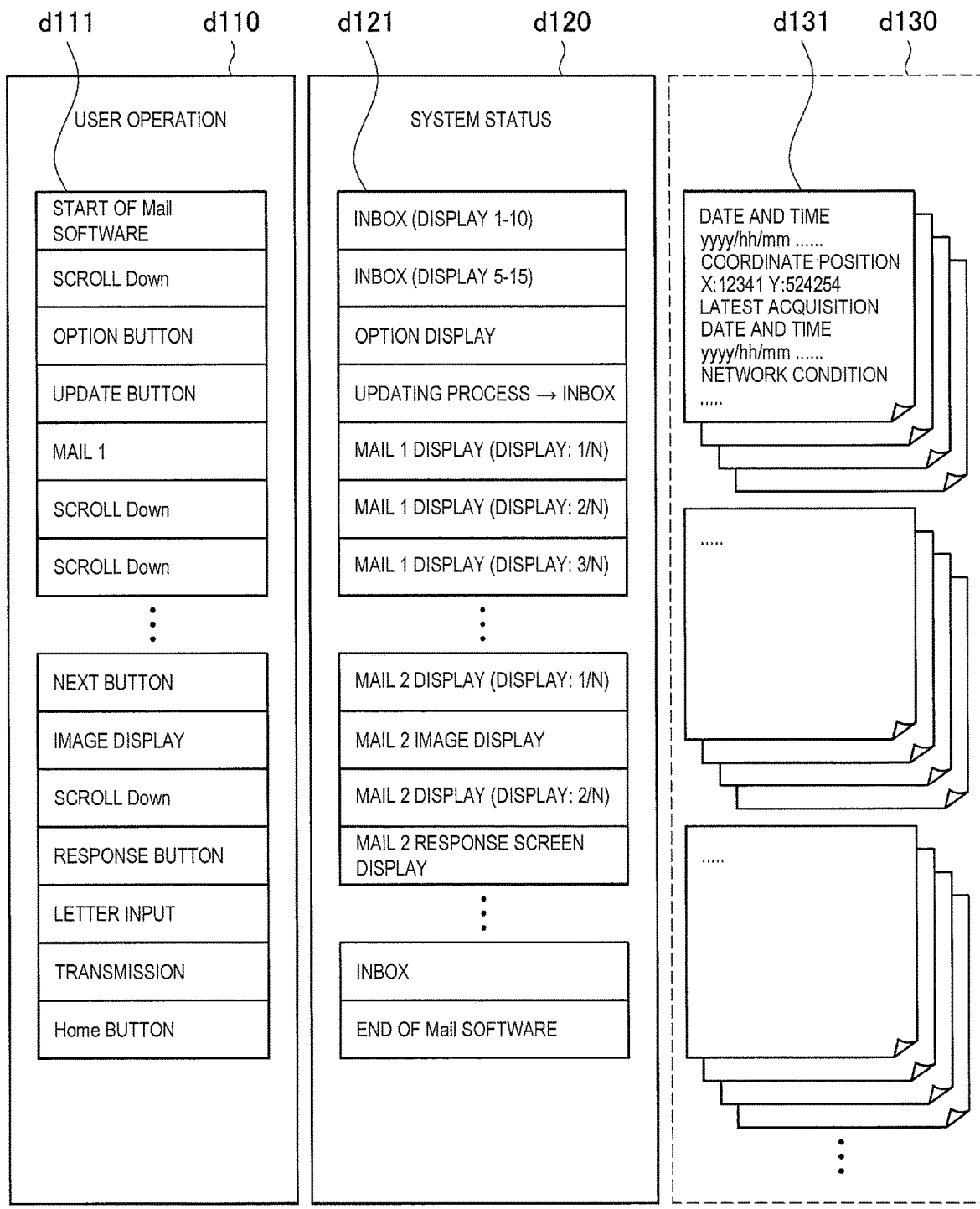
FIG. 7 is a diagram illustrating an example of data to be stored in a system information DB.

The system information and the history will be further described in detail with reference to FIG. 7. FIG. 7 is a diagram illustrating an example of data (i.e. system information) stored in the system information DB 202. As illustrated in FIG. 7, the system information DB 202 stores data indicated by a user operation d110, a system status d120, and a detailed status d130 as system information. As discussed above, the system information includes input information based on an operation of the user u10, and control information (such as a control parameter) indicating the state of the user terminal 10.

The user operation d110 indicates input information based on an operation of the user u10. Meanwhile, the system status d120 indicates control information indicating the state of the user terminal 10. The detailed status d130 is information indicating the more detailed content of the user operation d110 or the system status d120, and includes a date and time (time stamp) at which each piece of information was acquired and a detailed parameter such as a condition of a network at that time. As a specific example, once an operation indicating the "start of Mail software" is performed, an "inbox" is displayed in accordance with the "start of the Mail software" and a list of first to tenth mails is displayed. At this time, input information d111 indicating the "start of the Mail software" is acquired as the user operation d110, and then control information d121 indicating an "inbox (display 1-10" is acquired as the system status d120. Furthermore, detailed information d131 is acquired as the detailed status d130 corresponding to the input information d111 and the control information d121.

Additionally, the detailed status d130 may also be stored for each of the user operation d110 and the system status d120. As another example, the corresponding user operation d110 and system status d120 may be associated with each other and the detailed status d130 may be stored for each pair of the associated user operation d110 and system status d120. That is to say, as long as it is possible to recognize a chronological relationship between each user operation d110 and each system status d120, the user operation d110, the system status d120, and the detailed status d130 may be managed in any units.

The user experience managing unit 203 generates user experience data on the basis of a history of system information, and causes the user experience DB 204 to store the generated user experience data. The user experience DB 204 is a storage unit for storing user experience data. Specifically, the user experience managing unit 203 generates user experience data on the basis of a history of system information that is, for example, designated by the developer u30, and causes the user experience DB 204 to store the generated user experience data. This allows the developer u30 to cause the user experience DB 204 to store, in advance, user experience data related to a way of use for which it is desired to collect an opinion from the user u10.

Figure 8:
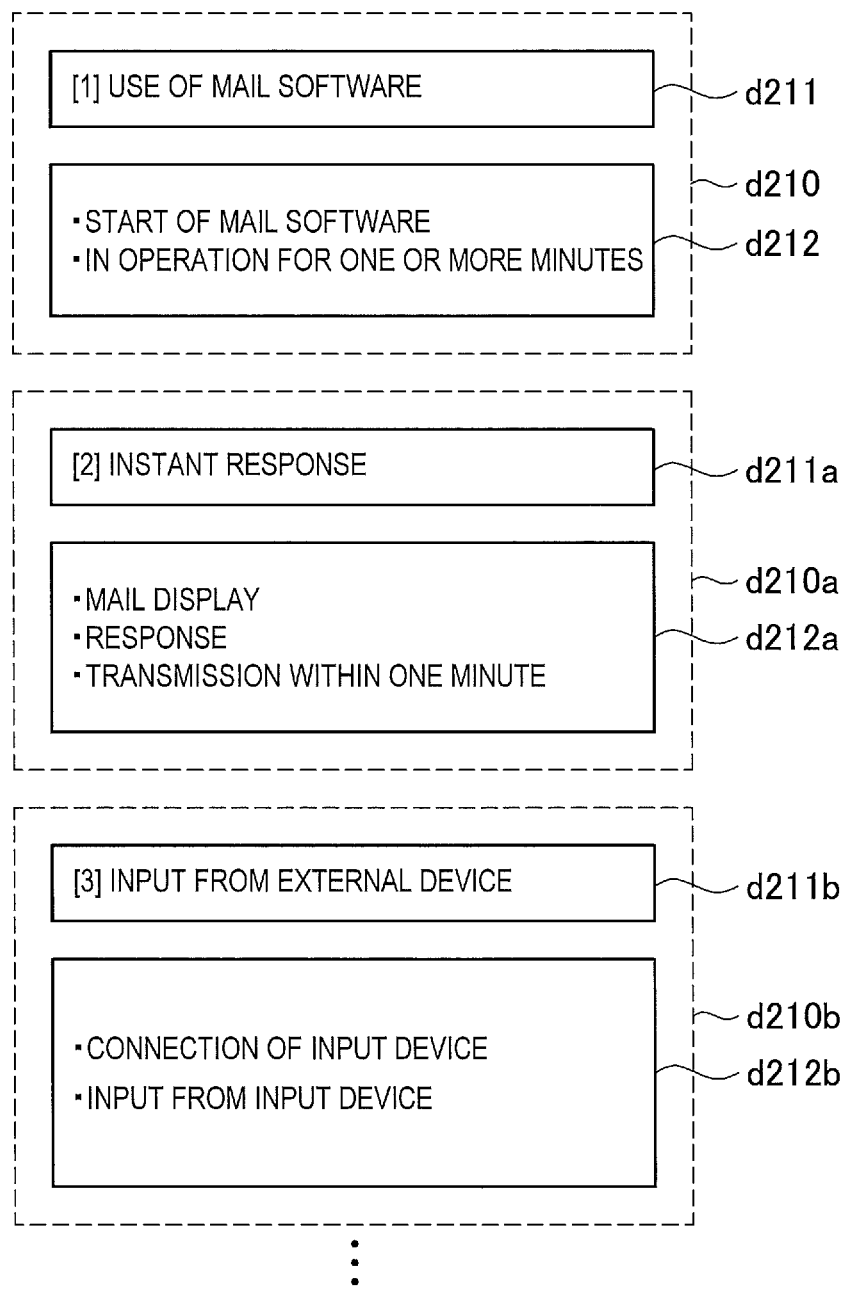
FIG. 8 is a diagram illustrating an example of user experience data to be stored in a user experience DB.

Here, user experience data to be stored in the user experience DB 204 will be described with reference to FIG. 8. FIG. 8 is a diagram illustrating an example of user experience data to be stored in a user experience DB.

As illustrated in FIG. 8, the user experience DB 204 stores one or more pieces of user experience data d210. Each piece of user experience data d210 stored in the user experience DB 204 corresponds to a user experience. The user experience data d210 includes identification information d211 and a condition d212.

The identification information d211 is information for identifying to which user experience the user experience data d210 corresponds.

The condition d212 indicates a history of system information corresponding to the user experience indicated by the identification information d211.

For example, user experience data d210a corresponds to a user experience of instantly responding to a mail. In this case, "[2] instant response" is set in identification information d211a as identification information indicating a user experience of instantly responding to a mail. Pieces of system information corresponding to "mail display," "response," and "transmission within one minute" are chronologically shown in this order as histories indicating the user experience corresponding to an instant response in a condition d212a of the user experience data d210a.

As another example, user experience data d210b corresponds to a user experience of inputting information from an external device. In this case, "[3] input from an external device" is set in identification information d211b as identification information indicating a user experience of inputting information from an external device. Pieces of system information corresponding to a "connection of an input device" and an "input from an input device" are chronologically shown in this order as histories indicating the user experience corresponding to an input from an external device in a condition d212b of the user experience data d210b.

In addition, the user experience managing unit 203 may generate the user experience data d210 on the basis of a history of system information stored in the system information DB 202.

As a specific example, when the comment registering unit 205 discussed below receives a comment from the comment receiving unit 102 of the user terminal 10, the user experience managing unit 203 may generate the user experience data d210 on the basis of a history of system information at the time at which that comment was input. In this case, the user experience managing unit 203 receives the terminal information on the user terminal 10, which is a transmission source of a comment, and a time stamp indicating the timing at which the comment was input from the comment registering unit 205.

The user experience managing unit 203 extracts histories of system information acquired with the user terminal 10, which is an acquisition source of the comment, from the user experience DB 204 on the basis of the terminal information acquired from the comment registering unit 205. The user experience managing unit 203 compares a time stamp of each piece of system information included in the extracted histories with the time stamp acquired from the comment registering unit 205 to identify, from the extracted histories, the system information at the timing at which the comment was input.

After identifying the system information at the timing at which the comment was input, the user experience managing unit 203 traces histories in chronological order on the basis of the identified system information to identify system information in the state corresponding to the start timing of an operation (which will be referred to as "standard state" below). The standard state indicates a standard state of an operation of the user terminal 10 which is observed, for example, immediately after a home button is pressed, or immediately after the user terminal 10 is started.

The user experience managing unit 203 extracts histories of system information from the identified standard state to the time when the comment was input. The user experience managing unit 203 generates the user experience data d210 on the basis of the extracted history of the system information, and causes the user experience DB 204 to store the generated user experience data d210. When the user experience DB 204 has already stored user experience data equal to the generated user experience data d210, the user experience managing unit 203 does not have to cause the user experience DB 204 to store the generated user experience data d210.

The user experience managing unit 203 reports to the comment registering unit 205 the identification information d211 for identifying the generated user experience data d210. This identification information d211 allows the comment registering unit 205 to identify the user experience data d210 corresponding to the state in which the comment has been acquired.

The user experience managing unit 203 reads out the user experience data d210 from the user experience DB 204, and transmits the user experience data d210 to the determination unit 103 of the user terminal 10. This synchronizes the series of user experience data stored in the determination unit 103 with each piece of user experience data d210 stored in the user experience DB 204.

Additionally, the timing at which the user experience managing unit 203 transmits the user experience data d210 to the determination unit 103 may be decided as necessary in accordance with an operation. For example, the user experience managing unit 203 may transmit the user experience data d210 to the determination unit 103 at predetermined timing. As another example, the user experience managing unit 203 may transmit the user experience data d210 to the determination unit 103 at the timing at which the user experience DB 204 is updated.

If the series of user experience data stored in the storage unit 103 can be synchronized with each piece of user experience data d210 stored in the user experience DB 204, the user experience managing unit 203 may transmit the user experience data d210 having any content to the determination unit 103. For example, the user experience managing unit 203 may transmit only the user experience data d210 that has been added or updated in the user experience DB 204 to the determination unit 103 as difference data. The user experience managing unit 203 may also transmit all the user experience data d210 stored in the user experience DB 204 to the determination unit 103.

The comment registering unit 205 acquires an opinion (i.e. comment and evaluation) on a user experience designated by the user u10 from the user terminal 10, and stores the acquired opinion in a comment management table d300 in the comment DB 206. The comment management table d300 stored in the comment DB 206 will be described first below, and then the operation of the comment registering unit 205 will be described. Additionally, the simple description "comment management table d300" will refer to the comment management table d300 to be stored in the comment DB 206 below.

First of all, the comment management table d300 to be stored in the comment DB 206 will be described with reference to FIG. 9. FIG. 9 is a diagram illustrating an example of the comment management table d300 to be stored in the comment DB 206. As illustrated in FIG. 9, the comment management table d300 includes an ID d310, a comment d320, an experience d330, an evaluation d340, and a related comment D350.

The ID d310 is identification information for identifying each comment stored in the comment management table d300. Meanwhile, the comment d320 indicates the content of a comment.

The experience d330 indicates a user experience with which the comment d320 indicated by the ID d310 is associated. Information indicated by the experience d330 corresponds to the identification information d211 (see FIG. 8) on the user experience data d210.

The evaluation d340 indicates the evaluation of the comment d320 indicated by the ID d310 by the user u10. The evaluation d340 includes the total number of reviews d341, an approval d342, an objection d343, and no comment d344.

The total number of reviews d341 indicates the total number of evaluations input for the comment d320 indicated by the ID d310. Meanwhile, each of the approval d342, the objection d343, and no comment d344 corresponds to an evaluation from the user u10. The approval d342 corresponds to the evaluation button v221 indicating an "approval" in the input screen v20 (see FIG. 5) in which the user u10 inputs an evaluation. Similarly, the objection d343 corresponds to the evaluation button v222 indicating an "objection" in the input screen v20, while no comment d344 corresponds to the evaluation button v223 indicating "no comment" in the input screen v20.

The related comment D350 indicates another comment d320 to which the comment d320 indicated by the ID d310 is related. For example, the ID d310 indicates in the example illustrated in FIG. 9 that the comment d320 in "N+2" is a comment obtained by relating the ID d310 to the comment d320 in "N+1."

The evaluation criteria of the evaluation d340 are not limited to the approval d342, the objection d343, and no comment d344 illustrated in FIG. 9. For example, the evaluation criteria may have five levels from "1" to "5." The evaluation criteria of the evaluation d340 may be set as necessary depending on the type of an evaluation target and the content of analysis based on the evaluation d340.

Next, the operation of the comment registering unit 205 will be described.

The comment registering unit 205 acquires a comment, a time stamp indicating the timing at which the comment was acquired, and terminal information on the user terminal 10, which is a transmission source, from the comment receiving unit 102 of the user terminal 10. The comment registering unit 205 reports the acquired time stamp and terminal information to the user experience managing unit 203, and acquires the identification information d211 on the user experience data d210 as the response.

The comment registering unit 205 registers the comment acquired from the comment receiving unit 102 and the identification information d211 acquired from the user experience managing unit 203 in the comment management table d300. At this time, the comment registering unit 205 registers the comment acquired from the comment receiving unit 102 as the comment d320, and registers the identification information d211 acquired from the user experience managing unit 203 as the experience d330.

The comment registering unit 205 further acquires the ID of the comment and information indicating the evaluation of the comment indicated by that ID from the review receiving unit 105 of the user terminal 10.

The comment registering unit 205 identifies the corresponding comment d320 from the comment management table d300 on the basis of the ID acquired from the review receiving unit 105. The comment registering unit 205 updates the information corresponding to the evaluation acquired from the review receiving unit 105 among the approval d342, the objection d343, and no comment d344 associated with the identified comment d320. For example, when the evaluation acquired from the review receiving unit 105 indicates an "approval," the comment registering unit 205 increases the value set in the approval d342. Meanwhile, the comment registering unit 205 increases the value set in the total number of reviews d341 associated with the identified comment d320.

The comment registering unit 205 further acquires the ID of the comment and information indicating the evaluation comment on the comment indicated by that ID from the review receiving unit 105.

The comment registering unit 205 identifies the experience d330 associated with the corresponding comment d320 from the comment management table d300 on the basis of the ID acquired from the review receiving unit 105. The comment registering unit 205 sets the evaluation comment acquired from the review receiving unit 105 as the comment d320, and registers this comment d320 in the comment management table d300 in association with the identified experience d330. The comment registering unit 205 further sets the ID of the comment acquired from the review receiving unit 105 in the related comment D350 of the registered comment d320. This registers a new evaluation comment on the comment indicated by the ID of the comment acquired from the review receiving unit 105 in the comment management table d300. Additionally, an evaluation of the evaluation comment newly registered in the comment management table d300 is also input as with the above-described comment. The comment registering unit 205 corresponds to an example of an "opinion registering unit."

The determination unit 103 designates user experience data, and the comment acquiring unit 207 is asked to report a comment associated with that user experience data. The comment acquiring unit 207 identifies the identification information d211 on the user experience data designated by the determination unit 103, and extracts the comment d320 on the user experience data designated by the determination unit 103 and the ID d310 of that comment d320 from the comment management table d300 on the basis of the identified identification information d211.

The comment acquiring unit 207 reports the comment d320 and the ID d310 extracted from the comment management table d300 to the determination unit 103.

Additionally, there are a plurality of comments d320 on the user experience data designated by the determination unit 103 in some cases. As a specific example, the comment d320 having the ID d310 indicated as "N+2" is associated with the comment d320 having the ID d310 indicated as "N+1," for example, in FIG. 9. That is to say, the respective comments d320 having the IDs d310 indicated as "N+1" and "N+2" both correspond to user experiences having the experiences d330 indicated through a "sound search conducted via a peripheral device." When the plurality of comments d320 are extracted, the comment acquiring unit 207 may report any of the extracted comments d320 to the determination unit 103 in this way.

As a specific example, the comment acquiring unit 207 may randomly identify the comment d320 to be reported to the determination unit 103 from the extracted comments d320, or may also identify the comment d320 that was registered at the latest timing.

The comment acquiring unit 207 may also identify the comment d320 to be reported to the determination unit 103 on the basis of the evaluation d340 associated with each comment d320. As a specific example, the comment acquiring unit 207 may report to the determination unit 103 the comment d320 having a small (e.g. smallest) total number of reviews d341. In this way, reporting to the determination unit 103 the comment d320 having a small total number of reviews d341 and acquiring an evaluation of that comment d320 allow the total number of reviews d341 on each comment d320 to be equalized.

The comment acquiring unit 207 may also weight the comment d320 to be reported to the determination unit 103 in accordance with the situation of an evaluation by the user u10 or the values of the approval d342, the objection d343, and no comment d344. For example, the comment acquiring unit 207 may preferentially report to the determination unit 103 the comment d320 having a greater difference between the number of approvals d342 and the number of objections d343. For example, the comment acquiring unit 207 may preferentially report to the determination unit 103 the comment d320 having a smaller difference between the number of approvals d342 and the number of objections d343. The comment acquiring unit 207 may also preferentially report to the determination unit 103 the comment d320 having a larger number of no comments d344.

When there are some extracted comments d320 in this way, the comment d320 reported by the comment acquiring unit 207 to the determination unit 103 may be changed as necessary in accordance with the state (e.g. evaluation situation) of the comment d320 for which an evaluation is desired.

The comment acquiring unit 207 extracts the comment d320 and the evaluation d340 from the comment management table d300 on the basis of an instruction from the developer u30 via the local terminal 30, and outputs the extracted comment d320 and evaluation d340 to the local terminal 30. At this time, the comment acquiring unit 207 may extract the comment d320 and the evaluation d340 on the basis of a search formula designated by the developer u30.

As another example, the comment acquiring unit 207 may identify the comment d320 and the evaluation d340 to be output to the local terminal 30 on the basis of a value set in the evaluation d340 and the timing at which each comment d320 was registered. Additionally, an example of a process for the comment acquiring unit 207 to identify the comment d320 and the evaluation d340 to be output to the local terminal 30 will be discussed below.

The above-described configuration of the information processing system 1 is an example, and the position of each structural element of the user terminal 10 and the server 20 is not limited in particular. For example, the determination unit 103 may be installed on the side of the server 20. In this case, the determination unit 103 may compare a history of system information accumulated in the system information DB 202 with the user experience data d210 stored in the user experience DB 204 on the basis of a history transmitted from the system information acquiring unit 101 of the user terminal 10. For example, the report unit 104 may be installed on the side of the server 20. In this case, the report unit 104 reports a comment associated with a predetermined user experience from a user to the user terminal 10 as information for acquiring an opinion on that comment (i.e. opinion related to the predetermined user experience).

Meanwhile, structural elements of the user terminal 10 and the server 20 may be installed in a single information processing device (such as the user terminal 10). In this case, the system information DB 202 may be configured to record only a history of system information acquired by an information processing device including each structural element of the user terminal 10 and the server 20.

An example has been described above in which the determination unit 103 temporarily stores the user experience data d210, but the determination unit 103 may also refer to the user experience DB 204 of the server 20 via the network N1.

<3. Process>
[3.1. Overview]

A series of processes performed by the information processing system 1 according to the present embodiment can be categorized into an "initial setting phase," a "phase for collecting a comment and an evaluation," and an "analysis phase." The process performed by the information processing system 1 will be described for each phase below.

[3.2. Initial Setting Phase]

Figure 10:
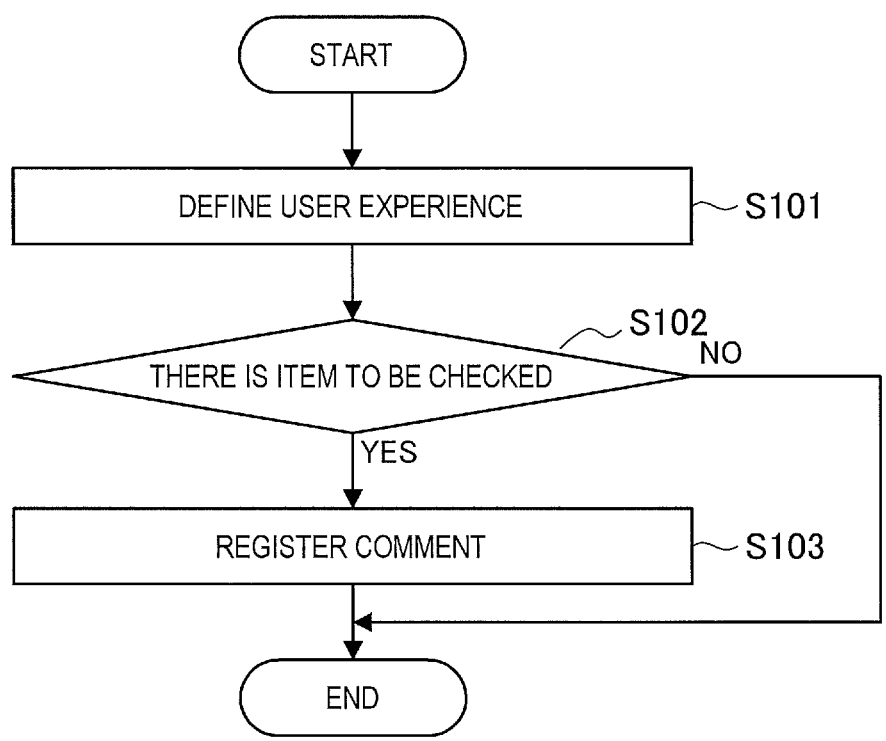
FIG. 10 is a flowchart illustrating an example of a process at an initial setting phase in an information processing system according to an embodiment of the present disclosure.

The initial setting phase is a phase at which the developer u30 registers, in advance, a user experience and a comment on that user experience for which it is desired to collect an opinion from the user u10. The process performed by the information processing system 1 at the initial setting phase will be described with reference to FIG. 10. FIG. 10 is a flowchart illustrating an example of the process at the initial setting phase in the information processing system 1.

(Step S101)

The developer u30 transmits, to the server 20, a history of system information related to a user experience (way of use) to be registered via the local terminal 30. The user experience managing unit 203 generates user experience data on the basis of a history of system information that is designated by the developer u30, and causes the user experience DB 204 to store the generated user experience data d210.

(Step S103)

When an opinion on the registered user experience data d210 is collected from each user u10 (step S102, Y), content desired to be checked by the user u10 for the user experience data d210 may be registered as a comment. In this case, the comment registering unit 205 acquires the comment on the user experience designated by the developer u30 from the local terminal 30, and stores the acquired comment in the comment management table d300 in the comment DB 206. Registering a comment in advance in this way allows the information processing system 1 to ask the user u10 to evaluate the registered comment when the user u10 performs the way of use corresponding to the user experience associated with that comment.

Additionally, when there is nothing to be desired to be checked by the user u10 for the user experience data d210 at the time at which the user experience data d210 was registered (step S102, N), a process of registering a comment may be skipped.

[3.3. Phase for Collecting Comment and Evaluation]

Figure 11:
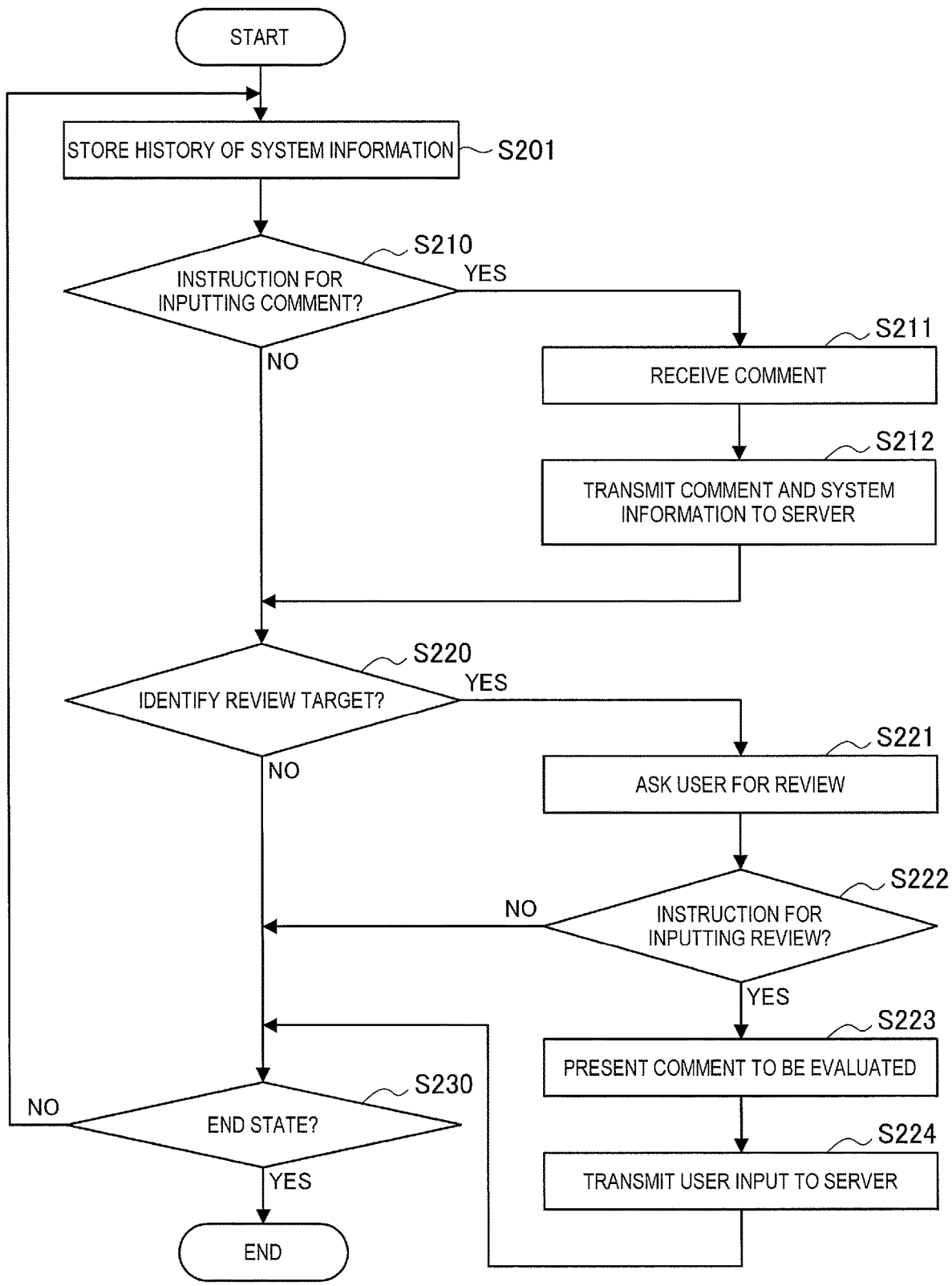
FIG. 11 is a flowchart illustrating an example of a process at a phase for collecting a comment and an evaluation in the information processing system according to the present embodiment.

The phase for collecting a comment and an evaluation is a phase at which a comment on a user experience and an opinion (i.e. evaluation and comment) on a comment associated with a user experience are collected from each user. The process performed by the information processing system 1 at the phase for collecting a comment and an evaluation will be described with reference to FIG. 11. FIG. 11 is a flowchart illustrating an example of the process at the phase for collecting a comment and an evaluation in the information processing system 1.

(Step S201)

The system information acquiring unit 101 monitors the content of an operation of the user u10 on the user terminal 10 and the state of the user terminal 10 at the time of the operation, and acquires system information. Examples of the system information include input information based on an operation of the user u10, and control information (such as a control parameter) indicating the state of the user terminal 10.

The system information acquiring unit 101 records the acquired system information and a time stamp indicating the timing at which the system information was acquired as histories.

(Step S211)

Once an instruction for inputting a comment is issued while the user u10 is operating the user terminal 10 or an application that operates in the user terminal 10 (step S210, Y), the comment receiving unit 102 presents a user interface (U/I) for inputting a comment to the user u10. The comment receiving unit 102 acquires a comment input by the user u10 into the presented U/I. Operating the comment receiving unit 102 in this way or instructing the user u10 to input a comment, for example, when the user u10 has trouble in the operation allows a comment on the operation performed by that time to be input. Unless the user u10 issues an instruction for inputting a comment (step S210, N), the processes in steps S211 and S212 are not executed, but the process transitions to the next step.

(Step S212)

Once the comment receiving unit 102 acquires a comment input by the user u10, the comment receiving unit 102 transmits the acquired comment to the server 20 in association with a time stamp indicating the timing at which that comment was acquired and the terminal information on the user terminal 10.

The comment receiving unit 102 may also instruct the system information acquiring unit 101 to transmit a history to the server 20 when the comment receiving unit 102 acquires a comment.

Once the system information acquiring unit 101 receives an instruction from the comment receiving unit 102, the system information acquiring unit 101 transmits the history of the recorded system information to the server 20 in association with the terminal information on the user terminal 10.

(Operation of Server 20 Based on Step S212)

Here, the operation of the server 20 based on the process in step S212 will be described with reference to FIG. 6.

The system information registering unit 201 acquires a history of system information and terminal information on the user terminal 10, which is a transmission source, from the system information acquiring unit 101 of the user terminal 10. The system information registering unit 201 arranges pieces of system information included in acquired histories in chronological order on the basis of a time stamp indicating the timing at which the pieces of system information were acquired, and stores the pieces of system information in the system information DB 202 for each piece of terminal information. Whenever the system information registering unit 201 acquires histories from the system information acquiring unit 101, the system information registering unit 201 accumulates pieces of system information included in the histories in the system information DB 202 in chronological order for each piece of terminal information. This accumulates a series of histories of system information in the system information DB 202 for each terminal (for each piece of terminal information).

The comment registering unit 205 acquires a comment, a time stamp indicating the timing at which the comment was acquired, and terminal information on the user terminal 10, which is a transmission source, from the comment receiving unit 102 of the user terminal 10. The comment registering unit 205 reports the acquired time stamp and terminal information to the user experience managing unit 203.

The user experience managing unit 203 acquires the time stamp indicating the timing at which the comment was input and the terminal information on the user terminal 10 from the comment registering unit 205.

The user experience managing unit 203 extracts histories of system information acquired with the user terminal 10, which is an acquisition source of the comment, from the user experience DB 204 on the basis of the terminal information acquired from the comment registering unit 205. The user experience managing unit 203 compares a time stamp of each piece of system information included in the extracted histories with the time stamp acquired from the comment registering unit 205 to identify, from the extracted histories, the system information at the timing at which the comment was input.

After identifying the system information at the timing at which the comment was input, the user experience managing unit 203 traces histories in chronological order on the basis of the identified system information to identify system information in the standard state corresponding to the start timing of an operation.

The user experience managing unit 203 extracts histories of system information from the identified standard state to the time when the comment was input. The user experience managing unit 203 generates the user experience data d210 on the basis of the extracted history of the system information, and causes the user experience DB 204 to store the generated user experience data d210.

The operation of the user experience managing unit 203 at this time will be described with reference to FIG. 2, using a specific example.

For example, let us assume that the user u10 inputs a letter along the routes r11 and r12, displays a search result as indicated by the operation c500, and inputs a comment at the timing of the operation c500. In this case, the system information DB 202 stores the pieces of system information corresponding to the state c100, the operation c210, and the operation c500 as histories in this order.

The user experience managing unit 203 identifies the system information corresponding to the operation c500 at the time at which the comment was input, on the basis of the time stamp acquired from the comment registering unit 205. Next, the user experience managing unit 203 identifies system information on the state c100 indicating the standard state while tracing the histories of the pieces of system information in chronological order.

The user experience managing unit 203 extracts the histories of the pieces of system information from the identified state c100 to the operation c500 at the time at which the comment was input. That is to say, the user experience managing unit 203 extracts the histories of the pieces of system information in which the pieces of the system information corresponding to the state c100, the operation c210, and the operation c500 are chronologically arranged in this order.

The user experience managing unit 203 generates user experience data on the basis of the extracted pieces of system information corresponding to the state c100, the operation c210, and the operation c500, and causes the user experience DB 204 to store the generated user experience data. This causes the user experience DB 204 to store the user experience data d210 corresponding to the "search by inputting a letter" indicated by the routes r11 and r12.

The user experience managing unit 203 reports to the comment registering unit 205 the identification information d211 for identifying the generated user experience data d210.

The comment registering unit 205 acquires the identification information d211 on the user experience data d210 from the user experience managing unit 203.

The comment registering unit 205 registers the comment acquired from the comment receiving unit 102 and the identification information d211 acquired from the user experience managing unit 203 in the comment management table d300.

(Step S220)

Here, FIG. 11 is referred to again. The determination unit 103 acquires data d210 indicating one or more user experiences decided in advance from the server 20, and stores the data d210.

The determination unit 103 acquires pieces of system information from the system information acquiring unit 101 in chronological order in which the pieces of system information were acquired. The determination unit 103 compares the pieces of system information acquired from the system information acquiring unit 101 and arranged in chronological order with histories included in the respective pieces of user experience data stored in advance.

(Step S221)

When the determination unit 103 detects a series of system information (i.e. histories) matching with histories included in any of user experience data from the pieces of system information arranged in chronological order (step S220, Y), the determination unit 103 causes the server 20 to report a comment associated with the user experience data having the histories with which the series of system information matches. When a comment is associated with the corresponding user experience data in the server 20, the determination unit 103 acquires the comment d320 associated with the user experience data and the identification information (i.e. ID d310) on that comment from the server 20. Unless a series of system information matching with the histories included in the user experience data is detected (step S220, N), the processes in steps S221 to S224 are not executed, but the process transitions to the next step.

When the determination unit 103 acquires the comment and the ID of the comment from the server 20, the determination unit 103 reports the acquired comment and the acquired ID of the comment to the report unit 104.

Once the report unit 104 acquires the comment and the ID of the comment from the determination unit 103, the report unit 104 reports to the user u10 that a comment is associated with a user experience based on the content of an operation of the user u10 and requests a review of that comment. FIGS. 4A to 4C each illustrate an instance of a screen for requesting (asking) the user u10 to make a review.
(Step S223)

Once a review input is selected in response to the report from the report unit 104 (step S222, Y), the report unit 104 reports to the review receiving unit 105 that an instruction regarding the review input has been issued and outputs the comment acquired from the determination unit 103 and the comment ID to the review receiving unit 105. Additionally, if an input of a review is not selected in response to the report from the report unit 104 (step S222, N), the processes in steps S223 and S224 are not executed, but the process transitions to the next step.

Once the review receiving unit 105 receives the report regarding the review input from the report unit 104, the review receiving unit 105 acquires the comment and the comment ID from the report unit 104. The review receiving unit 105 presents the comment associated with the user experience to the user u10, and displays an input screen v20 for receiving a review result of the comment. FIG. 5 illustrates an example of the input screen v20. It will be assumed below that the input screen v20 illustrated in FIG. 5 is displayed, and the description will be made.
(Step S224)

The review receiving unit 105 recognizes the evaluation of the evaluation target comment by the user u10 on the basis of an operation on any of the evaluation buttons v221 to v223, and reports information indicating the recognized evaluation and the ID of the evaluation target comment to the server 20. This report from the review receiving unit 105 allows the server 20 to identify the evaluation target comment on the basis of the reported ID of the evaluation target comment, and to associate the evaluation reported from the review receiving unit 105 with the identified evaluation target comment.

The review receiving unit 105 further receives an evaluation comment input into the comment input box v231 when the transmission button v232 is operated. The review receiving unit 105 reports the acquired evaluation comment and the ID of the evaluation target comment to the server 20. This report from the review receiving unit 105 allows the server 20 to identify the evaluation target comment on the basis of the reported ID of the evaluation target comment, and to associate the evaluation comment reported from the review receiving unit 105 with the identified evaluation target comment.
(Operation of Server 20 Based on Step S224)

Here, the operation of the server 20 based on the process in step S224 will be described with reference to FIG. 6.

The comment registering unit 205 further acquires the ID of the comment and information indicating the evaluation of the comment indicated by that ID from the review receiving unit 105 of the user terminal 10.

The comment registering unit 205 identifies the corresponding comment d320 from the comment management table d300 (see FIG. 9) on the basis of the ID acquired from the review receiving unit 105. The comment registering unit 205 updates the information corresponding to the evaluation acquired from the review receiving unit 105 among the approval d342, the objection d343, and no comment d344 associated with the identified comment d320. For example, when the evaluation acquired from the review receiving unit 105 indicates an "approval," the comment registering unit 205 increases the value set in the approval d342. Meanwhile, the comment registering unit 205 increases the value set in the total number of reviews d341 associated with the identified comment d320.

The comment registering unit 205 further acquires the ID of the comment and information indicating the evaluation comment on the comment indicated by that ID from the review receiving unit 105.

The comment registering unit 205 identifies the experience d330 associated with the corresponding comment d320 from the comment management table d300 on the basis of the ID acquired from the review receiving unit 105. The comment registering unit 205 sets the evaluation comment acquired from the review receiving unit 105 as the comment d320, and registers this comment d320 in the comment management table d300 in association with the identified experience d330. The comment registering unit 205 further sets the ID of the comment acquired from the review receiving unit 105 in the related comment D350 of the registered comment d320. This registers a new evaluation comment on the comment indicated by the ID of the comment acquired from the review receiving unit 105 in the comment management table d300. Additionally, an evaluation of the evaluation comment newly registered in the comment management table d300 is also input as with the above-described comment.
(Step S230)

Here, FIG. 11 is referred to again. The system information acquiring unit 101 continues a process of monitoring the content of an operation of the user u10 on the user terminal 10 and the state of the user terminal 10 at the time of the operation, and acquiring system information until the user terminal 10 is instructed to stop (step S230, N). Once the user terminal 10 is instructed to stop (step S230, Y), the user terminal 10 terminates the series of operations.
[3.4. Analysis Phase]

The analysis phase is a phase at which the developer u30 refers to and analyzes the comment d320 on a user experience accumulated in the comment DB 206 of the server 20 and the evaluation d340 of the comment d320 via the local terminal 30.

Once the developer u30 issues an instruction for extracting the comment d320 and the evaluation d340 from the local terminal 30, the comment acquiring unit 207 extracts the comment d320 and the evaluation d340 from the comment management table d300 in the comment DB 206 and outputs the extracted comment d320 and evaluation d340 to the local terminal 30. At this time, the comment acquiring unit 207 may extract the comment d320 and the evaluation d340 on the basis of a search formula designated by the developer u30.

As another example, the comment acquiring unit 207 may identify the comment d320 and the evaluation d340 to be output to the local terminal 30 on the basis of a value set in the evaluation d340 and the timing at which each comment d320 was registered.

For example, comments approved by less people have less validity and less reliability in some cases. The comment acquiring unit 207 may lower the priority of the comment d320 having a smaller number of approvals d342 and preferentially extract the comment d320 having a larger number of approvals d342 in preparation for such a case.

Paradoxically, comments to which more people object sometimes have higher reliability in the opposite meaning to the content of that comment. The comment acquiring unit 207 may preferentially extract the comment d320 having a larger number of objections d343 in preparation for such a case.

Comments having a higher ratio of no comments to the total number of reviews are supposed to be easy for each user to review or to be actively reviewed by each user, and sometimes have higher reliability. The comment acquiring unit 207 may decide the comment d320 to be extracted on the basis of the proportion of the number of no comments d344 to the total number of reviews d341 in preparation for such a case.

The comment acquiring unit 207 may also analyze the content of the comment d320 with a technique such as natural language processing to decide the priority of the comment d320 in accordance with whether the content of the comment d320 is affirmative or negative.

As a specific example, the comment acquiring unit 207 may preferentially extract the comment d320 having a negative content. In addition, the comment acquiring unit 207 may preferentially extract the comment d320 having a larger number of approvals d342 among the comments d320 having a negative content. Paradoxically, the comment acquiring unit 207 may preferentially extract the comment d320 having an affirmative content and a larger number of objections d343.

User experiences having a larger total number of reviews on comments can be determined to be used by more users u10. That is to say, user experiences having less (or no) comments and evaluations mean that the users u10 do not use the user experiences. Accordingly, the comment acquiring unit 207 may lower the priority of the comment d320 having a smaller total number of reviews d341 and extract another comment d320. The comment acquiring unit 207 may tally the number of evaluations d340 (such as the total number of reviews d341) of each experience d330, and present a tally result to the developer u30 via the local terminal 30.

As described above, the information processing system 1 according to the present embodiment asks the user u10 having a predetermined user experience (i.e. way of use to be evaluated) to evaluate a comment of another user u10 on that user experience. This allows the validity and reliability of each comment to be easily determined on the basis of an evaluation of the comment by each user u10.

<4. Modification>

Next, an information processing system 1 according to a modification will be described. The information processing system 1 according to the above-described embodiment causes the user u10 to ask the user u10 who has experienced the way of use corresponding to a predetermined user experience to evaluate a comment on the user experience. When the user u10 experiences the way of use corresponding to a predetermined user experience, the information processing system 1 according to the modification presents another way of use related to the way of use of the user u10. A specific description will be made below with reference to FIG. 2.

For example, let us assume that the user u10 conducts the "search by inputting a letter" indicated by the routes r11 and r12. In this case, the information processing system 1 may present to the user u10, for example, the "search by inputting a sound" indicated by the routes r21 and r22 as another way of use for executing the search function. Presenting another way of use related to the way of use corresponding to a certain user experience in this way allows the other way of use to be introduced or recommended to the user u10.

Additionally, when the information processing system 1 is operated in the above-described way, each piece of user experience data d210 is associated with the related user experience in advance. For example, the user experience data d210 corresponding to the "search by inputting a letter" may be associated with the user experience data d210 corresponding to the "search by inputting a sound" in the above-described example.

When a history of the acquired system information matches with predetermined user experience data d210, the determination unit 103 then identifies other user experience data d210 associated with that user experience data d210. The determination unit 103 may cause the report unit 104 to report the user experience corresponding to the identified other user experience data d210.

Feedback may be acquired from the user u10 regarding the reported way of use (user experience). For example, the user u10 who has conducted the "search by inputting a letter" may be presented with a comment indicating "a sound can be inputted. Do you know it?" and an evaluation result such as "I know it," "I do not know it," and "I know it, but I prefer this" can be input as an evaluation of this comment. Acquiring an evaluation of the reported way of use from the user u10 in this way allows the information processing system 1 to analyze which user experience (way of use) is recognized (or not recognized) by each user u10, on the basis of an evaluation result.

<5. Hardware Configuration>

The embodiment of the present disclosure has been described so far. The above-described information processing by the user terminal 10, the server 20, and the local terminal 30 can be implemented by software in cooperation with hardware of an information processing device 90 described below and used as the user terminal 10, the server 20, and the local terminal 30.

Figure 12:
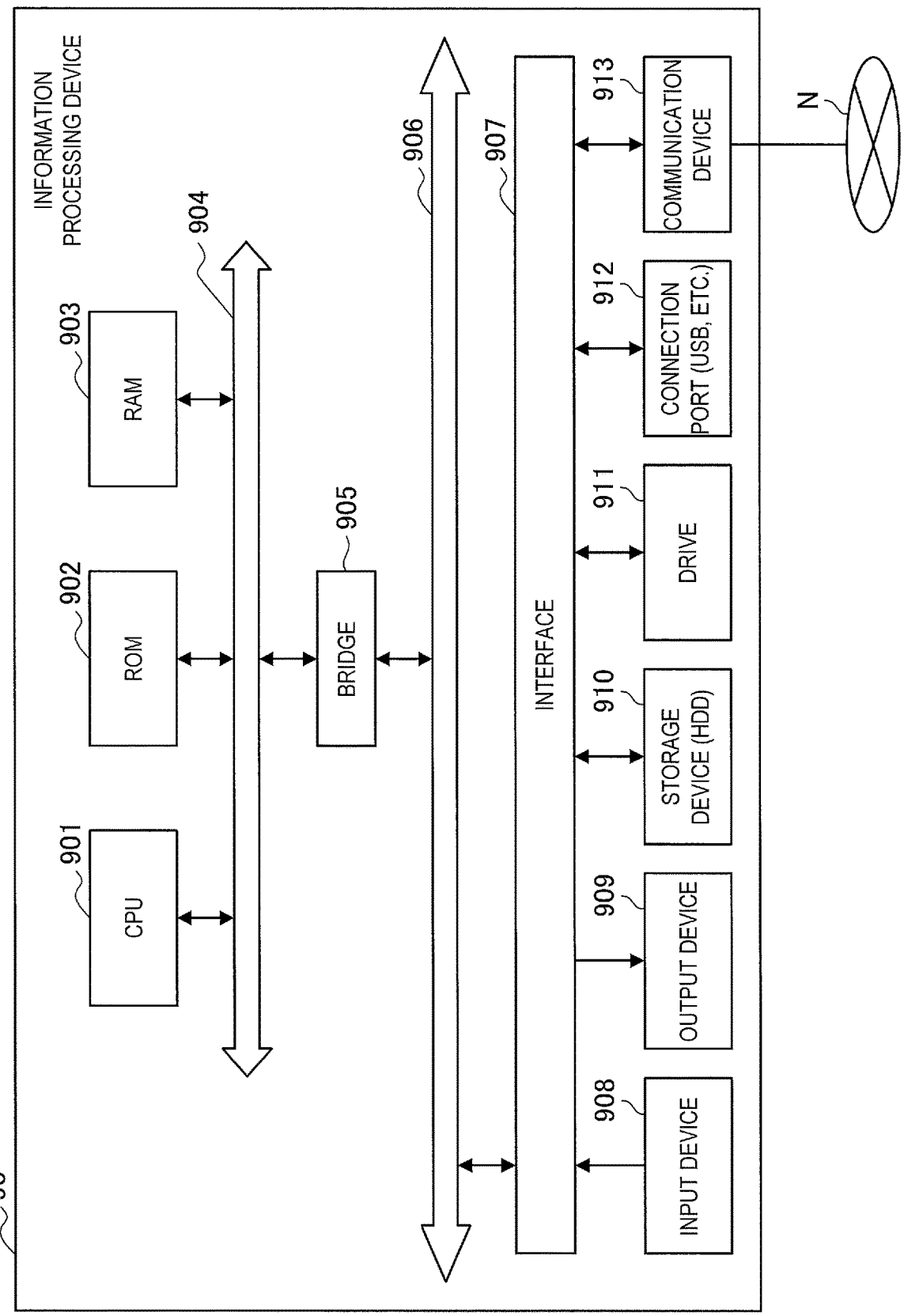
FIG. 12 is an explanatory diagram illustrating an example of a hardware configuration.

FIG. 12 is an explanatory diagram illustrating an example of the hardware configuration of the information processing device 90. As illustrated in FIG. 12, the information processing device 90 includes a central processing unit (CPU) 901, read only memory (ROM) 902, random access memory (RAM) 903, an input device 908, an output device 910, a storage device 911, a drive 912, and a communication device 915.

The CPU 901 functions as a processing device and a control device, and controls the whole operation of the information processing device 90 in accordance with a variety of programs. The CPU 901 may also be a microprocessor. The ROM 902 stores a program, an operation parameter, or the like that is used by the CPU 901. The RAM 903 temporarily stores a program used upon execution of the CPU 901, a parameter that changes as necessary for the execution, or the like. These are connected to each other by a host bus including a CPU bus.

The input device 908 includes an input means such as a mouse, a keyboard, a touch panel, a button, a microphone, a switch, and a lever for a user to input information, and an input control circuit that generates an input signal on the basis of the input from the user and outputs the input signal to the CPU 901. A user of the information processing device 90 can input a variety of data to the information processing device 90 and require the information processing device 90 to perform a processing operation by operating the input device 908.

The output device 910 includes a display device such as liquid crystal display (LCD) devices, organic light emitting diode (OLED) devices, and lamps. The output device 910 further includes an audio output device such as speakers and headphones. The display device, for example, displays a shot image, a generated image, and the like. Meanwhile, the audio output device converts audio data and the like to a sound, and outputs the sound.

The storage device 911 is a data storage device configured as an example of the storage unit of the information processing device 90 according to the present embodiment. The storage device 911 may include a storage medium, a recording device that records data on a storage medium, a read-out device that reads data out from a storage medium, and a deletion device that deletes data recorded on a storage medium. The storage device 911 stores a program and a variety of data executed by the CPU 901.

The drive 912 is a reader/writer for a storage medium, and is built in or externally attached to the information processing device 90. The drive 912 reads out information recorded on a removable storage medium such as mounted magnetic disks, optical discs, magneto-optical disks, and semiconductor memory, and outputs the read-out information to the RAM 903. The drive 912 can also write information into a removable storage medium.

The communication device 915 is, for example, a communication interface including a communication device and the like for a connection to the network N. The communication device 915 may also be a communication device supporting wireless local area networks (LANs), a communication device supporting Long Term Evolution (LTE), or a wired communication device performing wired communication.

Additionally, the network N is a wired or wireless transmission path through which information is transmitted from a device connected to the network N. The network N may include public networks such as the Internet, telephone networks and satellite networks, a variety of local area networks (LANs) including Ethernet (registered trademark), and wide area networks (WANs). The network N may also include leased line networks such as Internet protocol-virtual private networks (IP-VPNs).

<6. Conclusion>

As described above, the information processing system 1 according to the present embodiment asks the user having a predetermined user experience (i.e. way of use to be evaluated) to evaluate a subjective opinion (such as a comment) of another user on that user experience. Accordingly, it becomes possible to collect a review result having higher reliability.

The information processing system 1 according to the present embodiment asks users having the same experience to evaluate a comment, so that a user who generates a comment does not have to describe the detailed situation on the comment. This makes a user less reluctant to leave a comment as an expected advantageous effect.

As an expected advantageous effect, the information processing system 1 according to the present embodiment provides a user with an opportunity for reviewing an opinion of another user, thereby making the user inspired by the comment of the other user input an additional comment.

The information processing system 1 according to the present embodiment gathers review results of high reliability from other users who have the same experience, regarding a large number of subjective opinions from respective users. This allows the validity and reliability of each comment to be easily evaluated on the basis of an evaluation of the comment by each user.

Developers associate opinions (comments) with specific functions and ways of use in advance, thereby making it possible to gather opinions of respective users on a target function and way of use as evaluations of the opinions.

The preferred embodiments of the present disclosure have been described above with reference to the accompanying drawings, whilst the present disclosure is not limited to the above examples, of course. A person skilled in the art may find various alterations and modifications within the scope of the appended claims, and it should be understood that they will naturally come under the technical scope of the present disclosure.

Additionally, the present technology may also be configured as below.

(1)

An information processing device including:

a determination unit configured to acquire a first history of system information including at least any of input information based on an operation of a user and control information indicating a state at a time of the operation, and to compare the acquired first history with a second history including the system information stored in advance; and a report unit configured to make a report for acquiring an opinion related to the first history from the user on the basis of a result of a comparison made by the determination unit.

(2)

The information processing device according to (1), wherein the report unit makes the report when the first history matches with the second history.

(3)

The information processing device according to (2), wherein the report unit reports the opinion associated with the second history.

(4)

The information processing device according to (3), including:

an opinion acquiring unit configured to acquire an opinion of the user on a single opinion associated with the second history; and an opinion registering unit configured to associate the acquired opinion of the user with the single opinion.

(5)

The information processing device according to (4), wherein the opinion of the user includes an evaluation of the single opinion.

(6)

The information processing device according to (5), wherein the opinion of the user further includes supplementary information on the single opinion.

(7)

The information processing device according to (4) or (5), including:

an extraction unit configured to extract a part of the opinions from a plurality of the opinions stored in advance on the basis of the evaluation of each of the plurality of opinions.

(8)

The information processing device according to any one of (1) to (7), including:

a storage unit; and a system information registering unit configured to cause the storage unit to store the acquired first history as the second history.

(9)

An information processing system including:

a storage unit configured to store a history of system information including at least any of input information based on an operation of a first user and control information indicating a state at a time of the operation;
a determination unit configured to acquire the history of the system information based on an operation of a second user, and to compare the acquired history with the history that is stored in the storage unit and based on the operation of the first user; and
a report unit configured to make a report for acquiring an opinion related to the history based on the operation of the second user from the second user on the basis of a result of a comparison made by the determination unit.
(10)
An information processing method including:
acquiring a first history of system information including at least any of input information based on an operation of a user and control information indicating a state at a time of the operation, and comparing the acquired first history with a second history including the system information stored in advance; and
making a report for acquiring an opinion related to the first history from the user on the basis of a result of the comparison made by a determination unit.

REFERENCE SIGNS LIST 1 information processing system
10, 10a to 10c user terminal
101 system information acquiring unit
102 comment receiving unit
103 determination unit
104 report unit
105 review receiving unit
20 server
201 system information registering unit
202 system information DB
203 user experience managing unit
204 user experience DB
205 comment registering unit
206 comment DB
207 comment acquiring unit
30 local terminal
90 information processing device

The invention claimed is:
1. An information processing device, comprising:
a central processing unit (CPU) configured to:
  acquire a first history of system information, wherein the system information includes:
    input information, wherein the input information is based on an operation of a user, and
    control information that indicates a state of the information processing device at a time of the operation,
  the first history of the system information is acquired based on an update of the control information, and
  the update of the control information is based on a change in the state of the information processing device;
  compare the acquired first history with a second history, wherein the second history includes the system information stored in a server;
  acquire a comment from the server based on a result of the comparison that indicates the first history matches the second history, wherein the comment is associated with the second history; and
  generate a report based on the acquired comment, wherein
    the report is generated to acquire a first opinion from the user, and
    the first opinion is associated with the first history.
2. The information processing device according to claim 1,
wherein the CPU is further configured to report the first opinion associated with the second history.
3. The information processing device according to claim 2, wherein the CPU is further configured to:
  acquire a second opinion of the user on a third opinion, wherein the third opinion is associated with the second history; and
  associate the second opinion of the user with the third opinion.
4. The information processing device according to claim 3, wherein the second opinion of the user includes an evaluation of the third opinion.
5. The information processing device according to claim 4, wherein the second opinion of the user further includes supplementary information on the third opinion.
6. The information processing device according to claim 4,
wherein the CPU is further configured to extract a part from the third opinion, stored in the server, based on the evaluation of the third opinion.
7. The information processing device according to claim 1, further comprising a memory configured to store the acquired first history as the second history.
8. The information processing device according to claim 1, wherein
  the CPU is further configured to acquire the first history of the system information in a chronological order, and
  the chronological order is based on a timestamp at which the first history of the system information is acquired.
9. An information processing system, comprising:
a memory configured to store a first history of system information, wherein the system information includes:
  input information, wherein the input information is based on an operation of a user, and
  control information that indicates a state of an information processing device at a time of the operation of the user; and
a central processing unit (CPU) configured to:
  acquire the first history of the system information based on an update of the control information,
    wherein the update of the control information is based on a change in the state of the information processing device;
  compare a second history with the first history, wherein the second history includes the system information stored in a server;
  acquire a comment from the server based on a result of the comparison that indicates the first history matches the second history, wherein the comment is associated with the second history; and
  generate a report based on the acquired comment, wherein
    the report is generated to acquire an opinion from the user, and
    the opinion is associated with the second history.
10. An information processing method, comprising:
acquiring a first history of system information, wherein the system information includes:
  input information, wherein the input information is based on an operation of a user, and control information that indicates a state of an information processing device at a time of the operation, the first history of the system information is acquired based on an update of the control information, and the update of the control information is based on a change in the state of the information processing device;

comparing the acquired first history with a second history, wherein the second history includes the system information stored in a server;

acquiring a comment from the server based on a result of the comparison that indicates the first history matches the second history, wherein the comment is associated with the second history; and generating a report based on the acquired comment, wherein the report is generated to acquire an opinion from the user, and the opinion is associated with the first history.

\* \* \* \* \*